US012789687B2

(12) United States Patent
Willenborg et al.

(10) Patent No.: US 12,789,687 B2
(45) Date of Patent: Nov. 10, 2026

(54) VAN RAIL ATTACHABLE TABLE

(71) Applicant: Owl Vans, LLC, Mesa, AZ (US)

(72) Inventors: John Willenborg, Paradise Valley, AZ (US); Chris Lewis, Surprise, AZ (US)

(73) Assignee: Owl Vans, LLC, Mesa, AZ (US)

( * ) Notice: Subject to any disclaimer, the term of this patent is extended or adjusted under 35 U.S.C. 154(b) by 38 days.

(21) Appl. No.: 18/895,169

(22) Filed: Sep. 24, 2024

(65) Prior Publication Data

US 2026/0084604 A1 Mar. 26, 2026

(51) Int. Cl.
*B60N 3/00* (2006.01)

(52) U.S. Cl.
CPC .................................... *B60N 3/002* (2013.01)

(58) Field of Classification Search
CPC ....... B60N 3/002; B60N 3/001; A47F 5/0846; A47B 5/04; B60R 9/02; B60R 2011/004; B60R 7/08; B60R 5/041
USPC .......... 211/162, 90.01, 90.02, 99, 46, 94.01; 224/562, 510, 495, 281, 564, 556, 554, 224/543
See application file for complete search history.

(56) References Cited

U.S. PATENT DOCUMENTS

| | | | | |
|---|---|---|---|---|
| 1,809,866 | A * | 6/1931 | Riesche | A47B 5/04 108/134 |
| 7,802,708 | B2 * | 9/2010 | Adamczewski | B60R 9/02 224/543 |
| 8,303,028 | B2 * | 11/2012 | Domlovil | B62D 25/02 49/213 |
| 9,770,101 | B2 * | 9/2017 | Graham | B60N 3/005 |
| D1,039,870 | S * | 8/2024 | Pyle | D6/555 |
| 2022/0388378 | A1 * | 12/2022 | Suzuki | B60J 5/06 |

OTHER PUBLICATIONS

Meijer of Sweden, Etsy Web Page—ProMaster—Ducto Boxer—Movano—Jumper Retrieved from the Internet: https://www.etsy.com/listing/1666568438/railrack-ram-promaster-ducato-boxer, 8 pages, Sep. 12, 2024.

* cited by examiner

*Primary Examiner* — Corey N Skurdal
(74) *Attorney, Agent, or Firm* — Woodard, Emhardt, Henry, Reeves & Wagner, LLP

(57) ABSTRACT

A mounting system has been developed to mount objects to a vehicle. The mounting system includes one or more brackets. The brackets are configured to couple to a track of the vehicle. The track in some cases is part of a sliding door mechanism. The brackets are designed to minimize the risk of damage to the track. In one version, the brackets are configured to mount a folding table to the vehicle, but the brackets are designed to mount other types of objects to the vehicle. In some cases, the brackets include one or more stoppers to protect the table from being hit by a sliding door. The table in other forms includes a slide-out cutting surface.

20 Claims, 27 Drawing Sheets

VAN RAIL ATTACHABLE TABLE

BACKGROUND

Camping and tailgating are usually fun activities. However, one of the least desirable chores is selecting and setting up a site as well as breaking down the site afterwards. Finding dry and level ground for seats, tables, grills, and the like can be quite difficult. Moreover, setting up and breaking down this equipment can be time consuming. Similar issues occur to those who prefer or have to remotely work outdoors. Finding a place where one can quickly set up a laptop or a workbench can be quite difficult.

Thus, there is a need for improvement in this field.

SUMMARY

As noted before, finding a stable and secure location for performing various outdoor activities, such as camping, off-roading, tailgating, construction, repair, and remote work, can be a difficult and time-consuming proposition. Having a table, work surface, grill, or the like wobble or teeter during use due to unlevel, unstable, and/or wet ground conditions can be quite frustrating. Some expensive and/or delicate equipment, like electronics, needs to be properly secured to minimize the risk of damage. For example, it is quite common nowadays for someone to take a television, laptop computer, and/or portable battery power station while camping or tailgating. Placing these types of electronics on the ground is unacceptable due to the risk of water damage as well as the increased risk of being hit. As a result, these electronic items are commonly placed on unstable and/or unlevel surfaces, like on card tables or the beds of pickup trucks, that increase the risk of the television or other electronic device being damaged by toppling over onto the ground.

Nowadays, it is quite common for individuals to drive a vehicle, such as a van, pickup truck, or recreational vehicle (RV), to these types of outdoor activities. Often, the tables, chairs, grills, and the like are unloaded from the rear or tail-end of the vehicle, such as from the trunk or tailgate, and this furniture is placed directly behind the tail end of the vehicle. This tends to clutter the area behind the vehicle and creates choke points that inhibit access to the rear of the vehicle which in turn inhibits unpacking and packing of the vehicle. As a result, the setting up and breaking down of the site can take longer which can be especially frustrating during recreational time or work. Further compounding these issues is that some trailing hitch mounting systems are used to secure grills and bikes to the rear of vehicles. These trailer hitch mounting systems may inhibit, or in some cases, prevent access to food, drinks, clothing, equipment, and furniture in the rear of the vehicle. For example, no one may be able to access the rear of the vehicle when a trailer hitch mounted grill is being used, or even after use until the grill is cool.

A unique mounting system has been developed to address these issues as well as others. With the mounting system, the user is able to quickly secure furniture, tools, equipment, and other objects to the vehicle manually (i.e., by hand) without the need of tools. The mounting system further facilitates quick manual dismounting from the vehicle. For example, the mounting system in one version includes a folding table or workbench that securely mounts to the vehicle above the ground. Since the table is mounted to the vehicle, which is typically level, the table is likewise suitably level. In most cases, the table lacks any legs and relies solely on the vehicle to supply support. This avoids the wobbling or teetering issues associated with unlevel or unstable ground. In some cases, however, the mounting may include legs so as to provide further support. Once the table is no longer needed, the table can be folded out of the way for later use and/or quickly removed from the vehicle for packing. The mounting system can be used to safely and quickly mount and dismount a variety of objects on vehicles such as tables, workbenches, shelves, grills, cooktops, griddles, storage boxes, utility hooks, waste disposal units (e.g., garbage cans or bags), bicycle racks, portable generators, portable battery power stations, and ladders, to name just a few examples.

It was unexpectedly discovered that most systems have focused on the rear of the vehicle and have ignored the sides of the vehicle which tend to provide larger areas for activity than the rear of the vehicle. Rather than being located at the rear of the vehicle, the mounting system is located at and coupled to the sides of the vehicle such as the driver or passenger sides. Again, the sides of the vehicle are typically longer/wider than the rear of the vehicle which in turn provides a larger site area in which to set up and operate. Mounting the outdoor equipment, furniture, and the like to the side of the vehicle further helps to avoid the bottleneck issues discussed above with respect to the rear vehicle mounting set up. With the equipment and furniture located at the side of the vehicle, individuals are unencumbered from accessing the trunk or tailgate at the rear of the vehicle. This can promote quicker unpacking and packing of the vehicle. For example, a food preparation table and/or a grill can be first mounted to the side of the vehicle so as to facilitate food preparation while others continue to unload the vehicle and set up the site in an unencumbered manner.

In one variation, the mounting system includes one or more brackets that are configured to mount to a sliding door track or rail of a vehicle sliding door. To provide additional access to the cargo area, some vehicles include one or more side loading doors. These side loading doors in some designs use sliding doors to provide wider access as compared to conventional swing doors. Some common types of vehicles with sliding doors include delivery trucks and vans such as adventure type vans, minivans, cargo vans, utility vans, passenger vans, and work vans. For explanation purposes only, the mounting system will be described with reference to sliding doors in vans, but it should be recognized that the mounting system can be used with other types of vehicles such as those with sliding doors.

Sliding doors in vehicles typically include one or more tracks or rails that support and/or guide the sliding door as the door slides in a general longitudinal direction of the vehicle during opening and closing. In some designs, the sliding doors are opened and closed manually, and in other designs, the sliding doors are powered to promote automatic door opening and closing. In one common design, the vehicle includes an upper track located at the top of the door opening, a lower track located at the bottom of the door opening, and a middle or center track that is vertically located at a position between the upper and lower tracks. These tracks in most cases generally extend in the longitudinal direction along the sides of the vehicle. The tracks are generally straight, but in some cases, the tracks may have a curved section to promote door closure and seating. Typically, but not always, the middle track extends from one lateral side of the door opening back towards the rear of the vehicle along or above a side panel. When the sliding door is open, the door generally covers the middle track and side panel while the top and bottom tracks at the door opening are exposed. When the sliding door is closed, the generally opposite occurs in that the top and bottom tracks are covered by the door and the middle track along with the side panel is exposed. In some designs, the majority of the weight of the sliding door is supported by one of the tracks and the remaining tracks help guide the door. The type of sliding door can be categorized by which track or rail supports the load of the door. For instance, the top track supports most if not all of the weight of the sliding door in a top hung type sliding door, and the bottom track supports most if not all of the weight of the sliding door in a bottom hung sliding door. In some cases, the middle track can be used to support most (or all) of the weight of the sliding door. In other variations, two or more of the tracks can be used to support the weight of the sliding door. Other sliding door designs can have more or less tracks. For instance, some designs have a single track or two tracks, and other types of designs have three or more tracks.

In one common design, the sliding door is slidingly coupled to the upper and lower tracks via upper and lower sliding door rollers, respectively, and the door is slidingly coupled to the middle track via a hinge. The sliding door rollers and the hinge each have one or more roller wheels that are received inside their respective tracks to support and guide the sliding door through the sliding motions as well as in the various open and closed positions of the door. In some cases, the sliding door rollers and hinges may have two sets of roller wheels with axes of rotation oriented transverse (or perpendicular) to one another so as to provide support and/or guidance both in the vertical and horizontal directions. The tracks typically define channels in which the roller wheels are received. The tracks in some cases have one or more flanges against which the roller wheels roll so as to guide and/or support the movement of the sliding door. The engagement between some of the flanges and roller wheels may inhibit the sliding door from being pulled from the track in a lateral or horizontal direction and others may provide vertical alignment or support against the weight of the door. Typically, but not always, these vertical weight bearing flanges of the track are designed to be stronger than those inhibiting lateral movement.

Again, the mounting system in one variation is mounted to the vehicle through one or more brackets. The brackets are mounted to the tracks of the sliding door of the vehicle. In other variations, the brackets are configured to mount to tracks or rails on the side of the vehicles that are shaped in a fashion similar to those used in sliding doors but are not used for sliding doors. The number and location of the brackets coupled to the track can depend on several factors such as the weight and/or distribution of the load being supported by the brackets. For instance, the mounting system in one variation only has a single bracket for supporting relatively light loads such as a hook supporting rope, extension cords, hoses, and the like. In another example, the mounting system includes two brackets that support heavy loads like the folding table or work surface. In still yet other examples, the mounting system has three or more brackets for supporting still heavier loads, such as portable generators and portable battery power stations, or loads with different support requirements.

To provide a comfortable working height, the brackets for the table are mounted to the middle track of the sliding door. The middle track places the working surface of the table sufficiently high above the ground but not too high for most individuals. For instance, the height of the table when secured to the middle track may be comfortable for food preparation (e.g., chopping, cutting, etc.) as well as for typing on a computer. While the mounting system will be generally described as being mounted to the middle track or rail of the sliding door, it should be recognized that the mounting system can be secured to different tracks or various combinations of different tracks at the same time. In some cases, such as for hanging a mosquito net, one or more brackets are secured to the top track. In other cases, like for a step or ramp, one or more brackets are mounted to the bottom track. In still yet other variations, the brackets are secured to two or more different tracks at the same time. For instance, the brackets of the mounting system in one example are attached to the top track and the bottom track at the same time so as to support a ladder that facilitates access to the top of the vehicle.

It was discovered that the tracks of the sliding door provide an ideal mounting location. The tracks are designed to generally withstand the significant static and dynamic loads created during operation of the relatively heavy sliding door. Consequently, the mounting system can be used to support significant loads as well. However, the sliding door mechanism still can be damaged, and it can be quite expensive to fix a damaged sliding door mechanism. Even the slightest misalignment in the sliding door mechanism may result in the door not properly closing, locking, and/or opening. For example, any deformations in the tracks may inhibit smooth rolling of the roller wheels and drastic bends or deformations may cause the sliding door to jam or even derail. The brackets in the mounting system have been designed with these concerns in mind to avoid damaging the track during mounting, use, and dismounting. At the same time, the brackets have been designed to make the track mounting and dismounting process quick and easy without the need of tools.

The bracket is shaped to apply the loads from the mounted object where the track is strongest and avoids placing significant loads where the track is weaker. In other words, the load from the bracket generally mimics the forces applied by the sliding door to reduce the risk of track damage. The brackets of the mounting system are configured to apply the weight of the mounted object in a downward direction onto the track. In some versions, the center of mass of the mounted object is positioned below the track. In other words, the mounted object, such as the folding tray table, hangs below the brackets on the track. In one particular example, the bracket is shaped to apply the weight of the mounted object onto the weight bearing flange of the track. As noted before, the weight bearing flange or part of the track is typically strengthened to support some or all of the weight of the sliding door. The mounted object, such as the table, supported by the mounting system generally hangs via the bracket from the weight bearing flange of the track.

As alluded to before, the lateral guide flanges of the track, which inhibit lateral motion (e.g., derailment) of the roller wheels are typically subject to less loading stress as compared to the weight bearing flange during routine use of the sliding door. The lateral guide flange is usually only contacted by the roller wheels on an occasional basis. As a result, the lateral guide flange is sometimes made weaker than the weight bearing flange so as to reduce material usage and overall cost of the track.

It was discovered that earlier design iterations that engaged the outer edge of the lateral guide flange tended to create a moment arm that tended to undesirably bend the lateral guide flange in an outward direction. This outward bending of the lateral guide flange is similar to a pry bar action against the lateral guide flange. In at least one variation, the bracket is designed to minimize or avoid applying a significant lateral force, or worse yet a bending moment, against the lateral guide flange. In one form, the bracket has an angled insertion flange that is typically the first part of the bracket inserted into the channel of the track when mounting to the track. The insertion flange of the bracket is oriented at an angle that is transverse to the lateral guide flange. The end of the insertion flange has a contact ridge that is positioned proximally to the base or bend radius of the lateral guide flange where the lateral guide flange is stronger. When a lateral outward pulling force (i.e., away from the side of the vehicle) is applied to the object held by the mounting system, the contact ridge of the angled insertion bracket is pushed into the base or bend radius of the lateral guide flange.

Due to the angle of the insertion flange, some of the lateral force may occasionally cause the bracket to very slightly spread apart vertically so as to create a vertical clamping force in the track channel. However, most of the lateral force is typically converted into rotational motion of the bracket. The engagement of the contact ridge of the insertion flange of the bracket with the bend radius of the lateral guide flange forms a pivot axis about which the bracket and mounted object pivots. This pivoting motion requires considerable lifting force to vertically raise the mounted object. In other words, the lateral motion needs to provide considerable kinetic energy so as to raise the relatively heavy mounted object from a lower potential state to a higher potential state (i.e., to a higher position from the ground). In most cases, the inertial state of the mounted object prevents any significant rotational movement or raising of the object from the ground. In some variations, the folding table or other mounted object includes a vehicle panel coupler, such as one or more magnets, that secures an end or side of the object to the vehicle at a location that is distal from the pivot axis of the mounting bracket. The resulting large moment arm further resists any significant rotational movement. As a consequence, the lateral guide flange of the track experiences very little lateral or bending forces such that the track remains undamaged when small or common lateral pulling forces are applied to the mounted object like the folding table.

Even when the mounted object experiences a relatively large lateral force relative to the vehicle, the track will generally remain undamaged. Instead, the mounting system will dismount or disengage from the track before causing significant damage to the track. When a large force is applied, the mounted object and bracket will pivot about the rotational axis at the engagement between the contact ridge of the insertion flange of the bracket and the bend radius of the lateral guide flange of the track. In such a case, the bracket continues to rotate until the bracket reaches the dismounting position. At the dismounting position, the bracket disengages from the track and the object falls down onto the ground. The insertion flange is angled such that the bracket disengages before the angled insertion flange contacts and bends the lateral guide flange of the track. This helps preserve the track of the vehicle at the possible expense of damage of the fallen object. In most cases, this cost is justified by the high cost of sliding door repairs.

In further examples, the bracket has one or more stopper flanges that extend in the channel of the track to stop the longitudinal sliding motion of the door before hitting the folding table or other mounted object. This not only protects the mounted object but also the door.

As noted before, the mounted object in one example is a folding tray table. In one form, the folding tray table has a telescoping cutting board that is able to slide out from one or both sides of the table so as to provide additional preparation or cutting space. In one variation, the tray table has lips that hold the cutting board in place when folding. In some cases, the work surface is able to fold against a back plate. When installed, the back plate usually rests against the side panel of the vehicle. The back plate in one form is connected to the brackets. The table can be folded and locked into the back plate allowing the driver of the van to drive with the system still attached to the outside of the vehicle. This can be helpful when moving the van a short distance to a better location. In one example the back plate includes the panel couplers in the form of magnets to promote securing of the back plate to the side panel of the vehicle. The brackets and/or the back plate allow for the mounting of a variety of objects to the vehicle. In some cases, magnetics further can help to secure cutting knives to the back plate so as to reduce clutter on the table and/or cutting board.

The systems and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a vehicle.

Aspect 3 generally concerns the system of any previous aspect in which the vehicle is a van.

Aspect 4 generally concerns the system of any previous aspect in which the vehicle is a truck.

Aspect 5 generally concerns the system of any previous aspect in which the vehicle has a side panel.

Aspect 6 generally concerns the system of any previous aspect including a sliding door mechanism.

Aspect 7 generally concerns the system of any previous aspect in which the vehicle includes a sliding door mechanism.

Aspect 8 generally concerns the system of any previous aspect in which the sliding door mechanism includes a track.

Aspect 9 generally concerns the system of any previous aspect in which the track extends in a longitudinal direction along the side panel.

Aspect 10 generally concerns the system of any previous aspect in which the sliding door mechanism includes a door.

Aspect 11 generally concerns the system of any previous aspect in which the door is configured to slide along the track.

Aspect 12 generally concerns the system of any previous aspect in which the track is a top track dispose along a top of the door opening.

Aspect 13 generally concerns the system of any previous aspect in which the track is a bottom track disposed along a bottom of the door opening.

Aspect 14 generally concerns the system of any previous aspect in which the track is a middle track.

Aspect 15 generally concerns the system of any previous aspect in which the middle track extends along the side panel.

Aspect 16 generally concerns the system of any previous aspect in which the track defines a channel.

Aspect 17 generally concerns the system of any previous aspect in which the track defines a slot that opens into the channel.

Aspect 18 generally concerns the system of any previous aspect in which the track has a load flange.

Aspect 19 generally concerns the system of any previous aspect in which the sliding door mechanism has one or more roller wheels received in the channel of the track.

Aspect 20 generally concerns the system of any previous aspect in which the load flange is configured to support the roller wheels.

Aspect 21 generally concerns the system of any previous aspect in which the load flange supports the roller wheels in a vertical direction.

Aspect 22 generally concerns the system of any previous aspect in which the load flange at least in part supports the weight of the door.

Aspect 23 generally concerns the system of any previous aspect in which the track has a cover flange disposed opposite to the load flange.

Aspect 24 generally concerns the system of any previous aspect in which the vehicle defines a track notch where the track is mounted.

Aspect 25 generally concerns the system of any previous aspect in which the vehicle supports the load flange.

Aspect 26 generally concerns the system of any previous aspect in which the track has a mount wall.

Aspect 27 generally concerns the system of any previous aspect in which the track is mounted to the vehicle at the mount wall.

Aspect 28 generally concerns the system of any previous aspect in which the mount wall connects the load flange to the cover flange.

Aspect 29 generally concerns the system of any previous aspect in which the load flange has a hem.

Aspect 30 generally concerns the system of any previous aspect in which the track has a lateral guide flange.

Aspect 31 generally concerns the system of any previous aspect in which the lateral guide flange extends opposite to the mount wall.

Aspect 32 generally concerns the system of any previous aspect in which the lateral guide flange has a flange edge.

Aspect 33 generally concerns the system of any previous aspect in which the load flange and the lateral guide flange define the slot that opens into the channel.

Aspect 34 generally concerns the system of any previous aspect in which the slot is defined between the hem and the flange edge.

Aspect 35 generally concerns the system of any previous aspect including a mounting system mounted to the track.

Aspect 36 generally concerns the system of any previous aspect in which the mounting system mounts an object to the track.

Aspect 37 generally concerns the system of any previous aspect in which the mounting system includes a bracket.

Aspect 38 generally concerns the system of any previous aspect in which the bracket is configured to couple to the track of the sliding door mechanism.

Aspect 39 generally concerns the system of any previous aspect in which the bracket is configured to support the weight of the object on the load flange of the track.

Aspect 40 generally concerns the system of any previous aspect in which the bracket has a mount flange.

Aspect 41 generally concerns the system of any previous aspect in which the bracket is secured to the object at the mount flange.

Aspect 42 generally concerns the system of any previous aspect in which the mount flange defines a mount hole.

Aspect 43 generally concerns the system of any previous aspect in which the bracket has a fastener received in the mount hole to secure the object to the mount flange of the bracket.

Aspect 44 generally concerns the system of any previous aspect in which the bracket has a support flange.

Aspect 45 generally concerns the system of any previous aspect in which the support flange of the bracket is configured to rest against the load flange of the track when mounted.

Aspect 46 generally concerns the system of any previous aspect in which the support flange extends transverse relative to the mount flange.

Aspect 47 generally concerns the system of any previous aspect in which the bracket has a connector flange that connects the mount flange to the load flange.

Aspect 48 generally concerns the system of any previous aspect in which the connector flange bows away from the load flange to compensate for the shape of the side panel of the vehicle.

Aspect 49 generally concerns the system of any previous aspect in which the bracket has a brace flange.

Aspect 50 generally concerns the system of any previous aspect in which the brace flange extends transverse to the support flange.

Aspect 51 generally concerns the system of any previous aspect in which the brace flange faces the mount wall when the bracket is mounted in the track.

Aspect 52 generally concerns the system of any previous aspect in which the bracket has an insertion flange.

Aspect 53 generally concerns the system of any previous aspect in which the insertion flange has a contact ridge.

Aspect 54 generally concerns the system of any previous aspect in which the lateral guide flange of the track extends from the cover flange.

Aspect 55 generally concerns the system of any previous aspect in which the lateral guide flange has a base connected to the cover flange.

Aspect 56 generally concerns the system of any previous aspect in which the base includes a bend radius.

Aspect 57 generally concerns the system of any previous aspect in which the insertion flange extends towards the base of the track when the bracket is mounted to the track.

Aspect 58 generally concerns the system of any previous aspect in which the bracket includes a tailgate facing bracket.

Aspect 59 generally concerns the system of any previous aspect in which the bracket includes a door facing bracket.

Aspect 60 generally concerns the system of any previous aspect in which the bracket has a stopper extending from at least one side of the bracket.

Aspect 61 generally concerns the system of any previous aspect in which the stopper is configured to stop sliding of the door.

Aspect 62 generally concerns the system of any previous aspect in which the stopper is received in the channel of the track.

Aspect 63 generally concerns the system of any previous aspect in which the object includes a table.

Aspect 64 generally concerns the system of any previous aspect in which the object includes a trash bag holder.

Aspect 65 generally concerns the system of any previous aspect in which the object includes a television mount.

Aspect 66 generally concerns the system of any previous aspect in which the mounting system includes a vehicle coupler.

Aspect 67 generally concerns the system of any previous aspect in which the vehicle coupler is configured to secure the mounting system to the side panel of the vehicle.

Aspect 68 generally concerns the system of any previous aspect in which the vehicle coupler is located distally away from the bracket.

Aspect 69 generally concerns the system of any previous aspect in which the vehicle coupler includes a magnet.

Aspect 70 generally concerns the system of any previous aspect in which the magnet is covered in a coating to inhibit scuffing.

Aspect 71 generally concerns the system of any previous aspect including a folding tray table secured to the bracket.

Aspect 72 generally concerns the system of any previous aspect in which the folding tray table includes a tray pivotally coupled to a back plate.

Aspect 73 generally concerns the system of any previous aspect in which the folding tray table has a hinge that pivotally couples the tray to the back plate.

Aspect 74 generally concerns the system of any previous aspect in which the folding tray table has cutting board configured to slide out from at least one side of the tray.

Aspect 75 generally concerns the system of any previous aspect in which the folding tray table has a lock pin to secure the tray in a folded position.

Aspect 76 generally concerns the system of any previous aspect in which the folding tray table has a wire coupled to the back plate and the tray to brace the tray when unfolded.

Aspect 77 generally concerns the system of any previous aspect in which the back plate has a magnet to couple the back plate to a vehicle panel.

Aspect 78 generally concerns the system of any previous aspect in which the mounting system includes a hook coupled to the bracket.

Aspect 79 generally concerns the system of any previous aspect in which the mounting system includes a television mount coupled to the bracket.

Aspect 80 generally concerns the system of any previous aspect in which the bracket mimics loads applied to the track by the sliding door mechanism.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
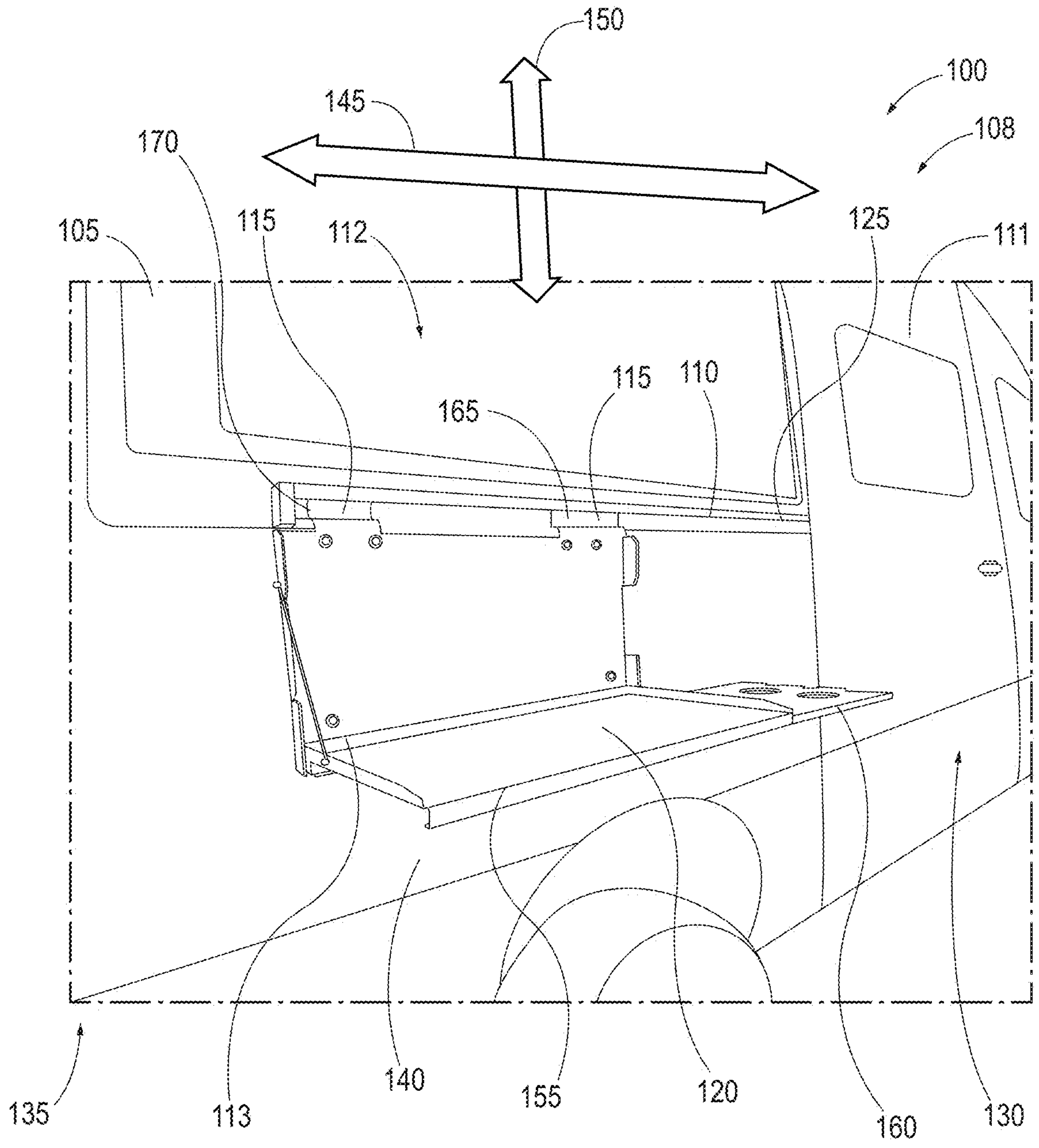
FIG. 1 is a front perspective view of a system with a table mounted via bracket to a track of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a system 100 that includes a vehicle 105 with a sliding door mechanism 108 located on at least one side 109 of the vehicle 105. The sliding door mechanism 108 includes a sliding door 111 and one or more tracks 110 along which the door 111 slides. The system 100 further includes a mounting system 112 configured to mount one or more objects 113 to the vehicle 105. In the illustrated example, the mounting system 112 includes one or more brackets 115 that secure a user attachment 120 to at least one of the tracks 110.

The sliding doors 111 in vehicles 105 typically include the tracks 110 that support and/or guide the sliding door 111 as the door 111 slides in a general longitudinal direction of the vehicle 105 during opening and closing. In some designs, the sliding doors 111 are opened and closed manually, and in other designs, the sliding doors 111 are powered to promote automatic opening and closing. In one common design, the vehicle 105 includes an upper track, a lower track, and a center or middle track 125. The side 109 of the vehicle 105 defines a door opening 130 wherein the door 111 is received when closed. Typically, but not always, the door 111 slides towards the tailgate end or rear 135 of the vehicle 105. When open, the door 111 generally covers at least part of a side panel 140 located near the rear 135 of the door 111.

As shown in FIG. 1, the vehicle 105 has a longitudinal axis 145 that extends from the front to the rear 135 of the vehicle 105. The vehicle 105 further has a vertical axis 150 that extends perpendicular to the longitudinal axis 145 in an up and down direction (i.e., relative to the ground or roadway). With reference to the vertical axis 150, the upper track is located at the top of the door opening 130, the lower track is located at the bottom of the door opening 130, and the middle track 125 is vertically located at a position between the upper and lower tracks 110. These tracks 110 in most cases extend generally parallel to the longitudinal axis 145 of the vehicle 105. In the illustrated example, the tracks 110 generally extend along the sides 109 of the vehicle 105. The tracks 110 are generally straight, but in some cases, the tracks 110 may have a curved section to promote door 111 closure and seating in the door opening 130. Typically, but not always, the middle track 125 extends from one lateral side of the door opening 130 back towards the rear 135 of the vehicle 105 along or above the side panel 140. When the sliding door 111 is open, the door 111 generally covers the middle track 125 and the side panel 140 while the top and bottom tracks at the door opening 130 are exposed. When the sliding door 111 is closed, the generally opposite occurs in that the top and bottom tracks are covered by the door 111 and the middle track 125 along with the side panel 140 is exposed. In some designs, the majority of the weight of the sliding door 111 is supported by one of the tracks 110 and the remaining tracks 110 help guide the door 111. The type of sliding door 111 can be categorized by which track 110 or rail supports the load of the door 111. For instance, the top track supports most if not all of the weight of the sliding door 111 in a top hung type sliding door mechanism 108, and the bottom track supports most if not all of the weight of the sliding door 111 in a bottom hung sliding door mechanism 108. In some cases, the middle track 125 can be used to support most (or all) of the weight of the sliding door 111. In other variations, two or more of the tracks 110 can be used to support the weight of the sliding door 111. Other sliding door mechanisms 108 can have more or less tracks 110. For instance, some designs have a single track 110 or two tracks 110, and other types of designs have three or more tracks 110.

In one common design, the sliding door 111 is slidingly coupled to the upper and lower tracks via upper and lower sliding door rollers, respectively, and the door 111 is slidingly coupled to the middle track 125 via a hinge. The sliding door rollers and the hinge each have one or more roller wheels that are received inside their respective tracks 110 to support and guide the sliding door 111 through the sliding motions as well as in the various open and closed positions of the door 111. In some cases, the sliding door rollers and hinges may have two sets of roller wheels with axes of rotation oriented transverse (or perpendicular) to one another so as to provide support and/or guidance both in the vertical direction and lateral direction. The tracks 110 typically define channels in which the roller wheels are received. The tracks 110 in some cases have one or more flanges against which the roller wheels roll so as to guide and/or support the movement of the sliding door 111. The engagement between some of the flanges and roller wheels may inhibit the sliding door 111 from being pulled from the track 110 in a lateral or horizontal direction and others may provide vertical alignment or support against the weight of the door 111 in the vertical axis 150. Typically, but not always, these vertical weight bearing flanges of the track 110 are designed to be stronger than those inhibiting lateral movement.

In one version, the brackets 115 are configured to mount to the tracks 110 of sliding door 111 of the vehicle 105. To provide additional access to the cargo area, some vehicles 105 include one or more side loading doors 111. These side 109 loading doors 111 in some designs use the sliding doors 111 to provide wider access as compared to conventional swing doors. Some common types of vehicles 105 with sliding doors 111 include delivery trucks and vans such as adventure type vans, minivans, cargo vans, utility vans, passenger vans, and work vans. For explanation purposes only, the mounting system 112 will be described with reference to sliding doors 111 in vans, but it should be recognized that the mounting system 112 can be used with other types of vehicles 105 such as those with sliding doors 111.

Again, the mounting system 112 in one variation is mounted to the vehicle 105 through one or more of the brackets 115. The brackets 115 are mounted to at least one of the tracks 110 of the sliding door 111 of the vehicle 105. In other variations, the brackets 115 are configured to mount to the rails or tracks 110 on the sides 109 of vehicles 105 that are shaped in a fashion similar to those used in the illustrated sliding door mechanism 108 but are not used for sliding doors 111. The number and location of the brackets 115 coupled to the track 110 can depend on several factors such as the weight and/or distribution of the load being supported by the brackets 115. For instance, the mounting system 112 in one variation only has a single bracket 115 where supporting relatively light loads such as a hook supporting rope, extension cords, hoses, and the like. In another example, the mounting system 112 includes two brackets 115 that support heavy loads like a folding table 155 or work surface of the type shown in FIG. 1. In still yet other examples, the mounting system 112 has three or more brackets 115 for supporting still heavier loads, such as portable generators and portable battery power stations, or loads with different support requirements.

The unique mounting system 112 has been developed to address the previously mentioned issues as well as others. With the mounting system 112, the user is able to quickly secure furniture, tools, equipment, and other objects 113 to the vehicle 105 manually (i.e., by hand) without the need of tools. The mounting system 112 further facilitates quick manual dismounting from the vehicle 105. For example, the object 113 mounted by the mounting system 112 in one version includes the folding table 155 or workbench that securely mounts to the vehicle 105 above the ground. Since the table 155 is mounted to the vehicle 105, which is typically level, the table 155 is likewise suitably level. In most cases, the table 155 lacks any legs and relies solely on the vehicle 105 to supply support. This avoids the wobbling or teetering issues associated with unlevel or unstable ground. In some cases, however, the mounting may include legs so as to provide further support. Once the table 155 is no longer needed, the table 155 can be folded out of the way for later use and/or quickly removed from the vehicle 105 for packing. The mounting system 112 can be used to safely and quickly mount and dismount a variety of objects 113 on vehicles 105 such as tables, workbenches, shelves, grills, cooktops, griddles, storage boxes, utility hooks, televisions, waste disposal units (e.g., garbage cans or bags), bicycle racks, portable generators, portable battery power stations, and ladders, to name just a few examples.

Once more, it was found that most traditional systems have focused on the rear 135 of the vehicle 105 and have ignored the sides 109 of the vehicle 105 which tend to provide larger areas for activity than the rear 135 of the vehicle 105. Rather than being located at the rear 135 of the vehicle 105, the mounting system 112 is located at and coupled to the sides 109 of the vehicle 105 such as the driver or passenger sides. Again, the sides 109 of the vehicle 105 are typically longer/wider than the rear 135 of the vehicle 105 which in turn provides a larger site area in which to set up and operate. Mounting the outdoor equipment, furniture, and the like to the side 109 of the vehicle 105 further helps to avoid the bottleneck issues discussed above with respect to the rear vehicle mounting set up. With the equipment and furniture located at the side 109 of the vehicle 105, individuals are unencumbered from accessing the trunk or tailgate at the rear 135 of the vehicle 105. This can promote quicker unpacking and packing of the vehicle 105. For example, a food preparation table and/or a grill can be first mounted to the side 109 of the vehicle 105 so as to facilitate food preparation while others continue to unload the vehicle 105 and set up the site in an unencumbered manner.

In the example depicted in FIG. 1, the object 113 or attachment 120 that is mounted to the track 110 is the folding tray table 155 that facilitates food preparation. The table 155 has an extendable cutting surface 160 that is configured to extend from at least one side of the table 155 so as to provide a surface for cutting or chopping food. In one form, the cutting surface 160 is in the form of a wooden cutting board, but the cutting surface 160 in other examples can take different forms and can be made from other materials like plastic. To provide a comfortable working height, the brackets 115 for the table 155 are mounted to the middle track 125 of the sliding door mechanism 108. The middle track 125 places the working surface of the table 155 sufficiently high above the ground but not too high for most individuals. For instance, the height of the table 155 when secured to the middle track 125 may be comfortable for food preparation (e.g., chopping, cutting, etc.) as well as for typing on a computer. While the mounting system 112 will be generally described as being mounted to the middle track 125 or rail of the sliding door 111, it should be recognized that the mounting system 112 can be secured to different tracks 110 or various combinations of different tracks 110 at the same time. In some cases, such as for hanging a mosquito net, one or more of the brackets 115 are secured to the top track. In other cases, like for a step or ramp, one or more of the brackets 115 are mounted to the bottom track. In still yet other variations, the brackets 115 are secured to two or more different tracks 110 at the same time. For instance, the brackets 115 of the mounting system 112 in one example are attached to the top track 110 and the bottom track 110 at the same time so as to support a ladder that facilitates access to the top of the vehicle 105.

It was discovered that the tracks 110 of the sliding door 111 provide an ideal mounting location. The tracks 110 are designed to generally withstand the significant static and dynamic loads created during operation of the relatively heavy sliding door 111. Consequently, the mounting system 112 can be used to support significant loads as well. However, the sliding door mechanism can be still damaged, and it can be quite expensive to fix a damaged sliding door mechanism. Even the slightest misalignment in the sliding door mechanism 108 may result in the door 111 not properly closing, locking, and/or opening. For example, any deformations in the tracks 110 may inhibit smooth rolling of the roller wheels and drastic bends or deformations may cause the sliding door 111 to jam or even derail. The brackets 115 in the mounting system 112 have been designed with these concerns in mind to avoid damaging the tracks 110 during mounting, use, and dismounting. At the same time, the brackets 115 have been designed to make the track 110 mounting and dismounting process quick and easy without the need of tools.

In some examples, the brackets 115 in the mounting system 112 have the same shape or structure such that the brackets 115 are considered to be the same part, and in other examples, the brackets 115 can be different in the same mounting system 112. As shown in FIG. 1 for example, the brackets 115 of the mounting system 112 include a door facing bracket 165 and a tailgate facing bracket 170 that are structured differently. When the table 155 is mounted to the track 110, the door facing bracket 165 is positioned proximal to or faces the sliding door 111, and the tailgate facing bracket 170 is positioned proximal to the rear 135 of the vehicle 105. To reduce the risk of the door 111 and/or the table 155 from being damaged when the sliding door 111 is accidentally opened, the door facing bracket 165 includes the stopper structure that engages one or more of the roller wheels in the sliding door mechanism 108 so as to stop the door 111 from moving. In other examples, the table 155 has door facing brackets 165 on both sides so that the table 155 can be mounted to the tracks 110 on either side 109 of the vehicle 105.

Figure 2:
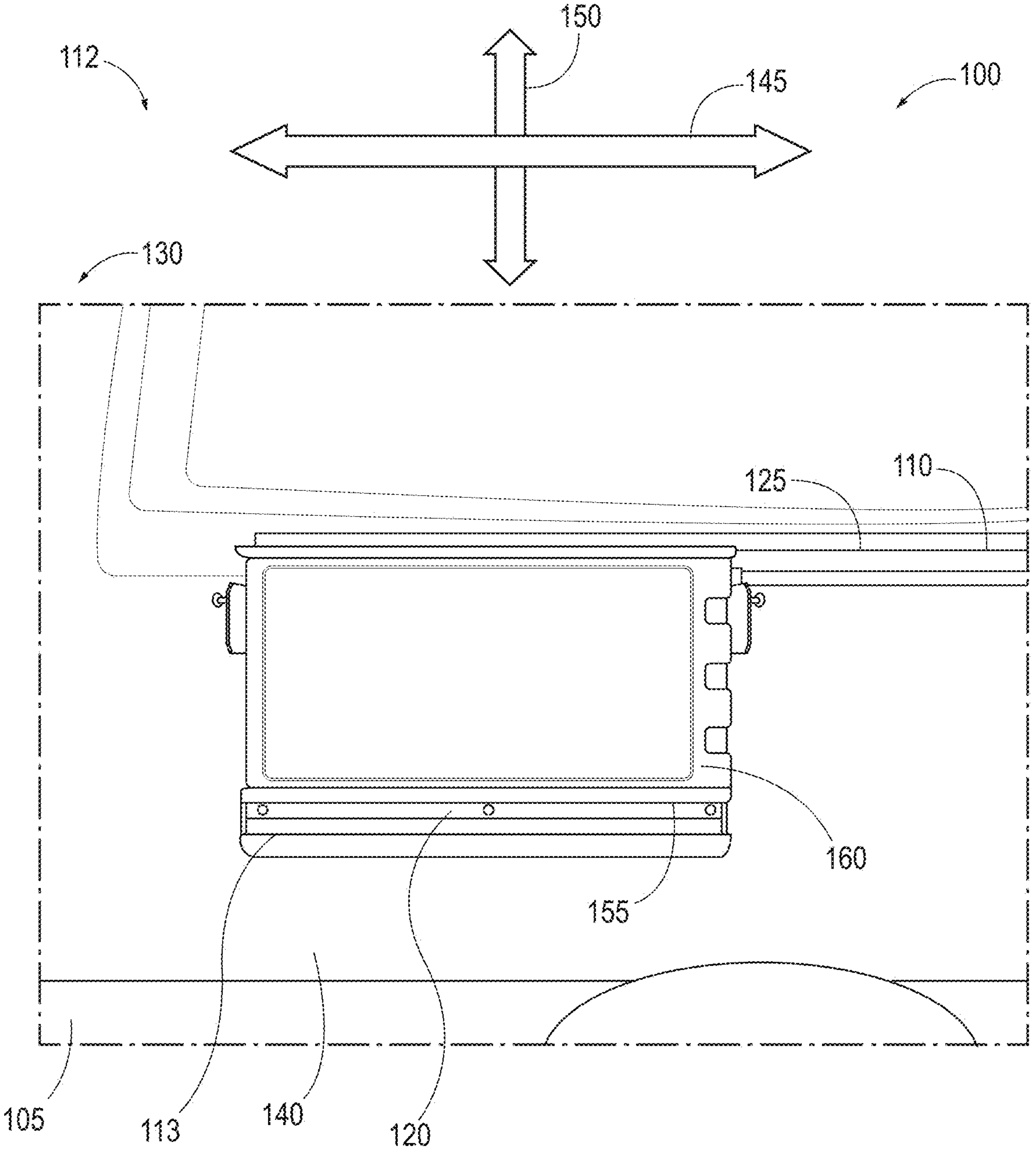
FIG. 2 is a front view of the table in a folded position on the vehicle.

Turning to FIG. 2, the table 155 is depicted in a folded position. The folded position reduces the distance the attachment 120 protrudes from the vehicle 105, when the table 155 is folded, there is a lower risk of the table striking an object, such as a tree branch, along the road or driving path during driving of the vehicle. The table 155 is tucked towards the side panel 140 such that the side mirrors of the vehicle extend farther away from the vehicle 105 than the table 155. The table 155 in the folded position also provides a more streamlined surface area such that the vehicle 105 can drive at relatively high speeds without the table 155 becoming detached from the vehicle 105. The brackets 115 can attach to any position of the track 110. In one example the brackets 115 are coupled to the track 110 at the furthest end from the door 111 to reduce interference of functionality of the door 111.

Figure 3:
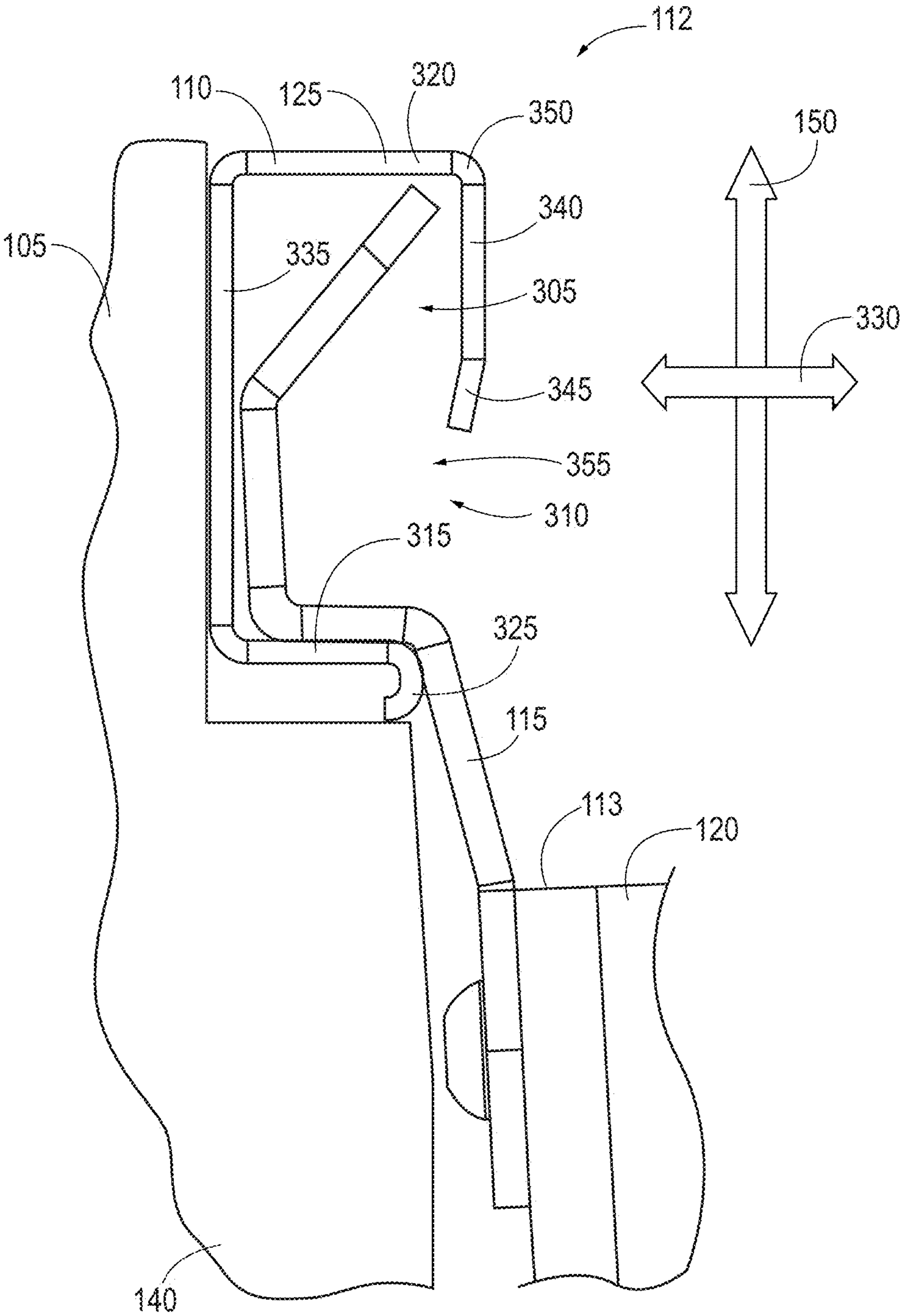
FIG. 3 is an enlarged cross-sectional view of the track and the bracket.

FIG. 3 shows a cross-sectional view of the bracket 115 secured to the track 110. In the illustrated example, the track 110 is the middle track 125, but other types of tracks 110 can be used to secure the bracket 115 in other examples. The track 110 defines a roller wheel channel 305 where the roller wheels are received. As mentioned before, the roller wheels help to support and guide the sliding door 111 as the door 111 moves along the track 110. The track 110 further defines a track slot 310 through which the arm of the hinge or sliding door roller of the sliding door 111 normally extends. When mounted, part of the bracket 115 extends through the slot 310. To vertically support the door 111 in the vertical axis 150, the track 110 has a load flange 315. Typically, but not always, at least one of the roller wheels for the hinge or sliding door roller rolls along the load flange 315. Opposite to the load flange 315 in the vertical axis 150, the track 110 has a cover flange 320. The cover flange 320 helps to retain the roller wheels in the track 110 in the vertical direction. In the depicted example, the load flange 315 has an open hem 325 so as to provide a relatively smooth exterior surface or edge. In other examples, the track 110 does not include the hem 325.

As noted before, the track 110 further prevents derailment by guiding one or more roller wheels in the lateral direction. As can be seen, the track 110 has a lateral axis 330 that is oriented perpendicular to the vertical axis 150. The lateral axis 330 is also oriented perpendicular to the longitudinal axis 145 (FIG. 1). To provide guidance along the lateral axis 330, the track 110 has a mount wall 335 and a lateral guide flange 340 located on opposite sides relative to the lateral axis 330. The mount wall 335 connects the load flange 315 to the cover flange 320. In most, but not all cases, the track 110 is secured to the vehicle 105 by bolting or otherwise fastening the mount wall 335 of the track 110 to the side panel 140 of the vehicle 105. At one end, the lateral guide flange 340 has a flange edge 345. The flange edge 345 of the lateral guide flange 340 along with the hem 325 of the load flange 315 define the slot 310. The flange edge 345 in the illustrated example slightly bows or bends towards the mount wall 335 in order to promote retention of the guiding roller wheels. In other words, the flange edge 345 is bent at a slightly transverse angle relative to the rest of the lateral guide flange 340 and the vertical axis 150. At the corner or intersection between the cover flange 320 and the lateral guide flange 340, the lateral guide flange 340 has a bend radius or base 350 that is located opposite to the flange edge 345.

The bracket 115 is shaped to apply the loads from the mounted object 113 where the track 110 is strongest and avoids placing significant loads where the track 110 is weaker. In other words, the load from the bracket 115 generally mimics the forces applied by the sliding door 111 to reduce the risk of track 110 damage. The brackets 115 of the mounting system 112 are configured to apply the weight of the mounted object 113 in a downward direction onto the track 110. In some versions, the center of mass of the mounted object 113 is positioned below the track 110. In other words, the mounted object 113, such as the folding tray table 415, hangs below the brackets 115 of the track 110. In one particular example, the bracket 115 is shaped to apply the weight of the mounted object 113 onto the load flange 315 of the track 110. As noted before, the load flange 315 or part of the track 110 is typically strengthened to support some or all of the weight of the sliding door 111. The mounted object 113, such as the table 155, supported by the mounting system 112 generally hangs via the bracket 115 from the load flange 315 of the track 110.

The track 110 can be manufactured in a number of ways. For example, the track 110 can be made via roll forming, stamping, machining, and/or extruding processes, to name just a few. As alluded to before, the lateral guide flange 340 of the track 110, which inhibits lateral motion in the direction of the lateral axis 330 (e.g., derailment) of the roller wheels are typically subject to less loading stress as compared to the load flange 315 during routine use of the sliding door 111. The lateral guide flange 340 is usually only contacted by the roller wheels on an occasional basis. As a result, the lateral guide flange 340 is sometimes made weaker than the load flange 315 so as to reduce material usage and overall cost of the track 110. In other cases, the track 110 is manufactured to have uniform thickness, but the vehicle 105 provides greater support for the load flange 315 than the lateral guide flange 340. As shown in FIG. 3, the side panel 140 of the vehicle 105 defines a track notch 355 where the track 110 is mounted. As can be seen, the load flange 315 and the mount wall 335 of the track 110 are braced against and supported by the side panel 140 of the vehicle 105. In contrast, the cover flange 320 and the lateral guide flange 340 are unsupported such that the lateral guide flange 340 has a greater chance of flexing or bending, especially near the flange edge 345.

It was discovered that earlier design iterations that engaged the flange edge 345 of the lateral guide flange 340 tended to create a moment arm that tended to undesirably bend the lateral guide flange 340 in an outward direction from the vehicle 105. This outward bending of the lateral guide flange 340 is similar to a pry bar action against the lateral guide flange 340. In at least one variation, the bracket 115 is designed to minimize or avoid applying a significant lateral force, or worse yet a bending moment, against the lateral guide flange 340. The bracket 115 mimics the forces applied by the roller wheels by applying most, if not all, of the weight of the object 113 and the bracket 115 on the load flange 315 which tends to be stronger than the lateral guide flange 340. In other words, the bracket 115 hangs from the relatively strong and supported load flange 315. As will be explained further below, the bracket 115 has an angled insertion flange that is typically the first part of the bracket 115 inserted into the channel 305 of the track 110 when mounting to the track 110. The insertion flange of the bracket 115 is oriented at an angle that is transverse to the lateral guide flange 340. The end of the insertion flange has a contact ridge that is positioned proximally to the base or base 350 of the lateral guide flange 340 where the lateral guide flange 340 is stronger. When a lateral outward pulling force (i.e., away from the side 109 of the vehicle 105) is applied along the lateral axis 330 to the object 113 held by the mounting system 112, the contact ridge of the angled insertion bracket 115 is pushed into the base or base 350 of the lateral guide flange 340. It was also found that design iterations that clipped to the flange edge 345 of the lateral guide flange 340 tended to rely on frictional forces to hold things up. In some cases, frictional contacts would rub against the side panel 140 which would cause scuffing. Moreover, the frictional contacts would tend to slip so as to unexpectedly drop the supported object. By having weight from the bracket 115 rest on the load flange 315 of the track 110, the mounting system 112 is firmly secured to the track 110.

The shape or geometry of the tracks 110 can vary depending on the manufacturer, make, model, and/or year of the brackets 115. In the mounting system 112, the bracket 115 can be swapped out or changed depending on the shape or geometry of the tracks 110. Thus, the object 113 or attachment 120 can have the same design and can be used across different vehicle makes, models, or years through the use of bracket 115 that are especially adapted to the design of the track 110 used in the sliding door mechanism 108. For instance, by changing the brackets 115 the same table 155 can be used on different types of vehicles. Likewise, the same bracket design can be used to mount different objects 113, such as tables 155, televisions, and the like, on vehicles 105 that have the same track design.

Figure 4:
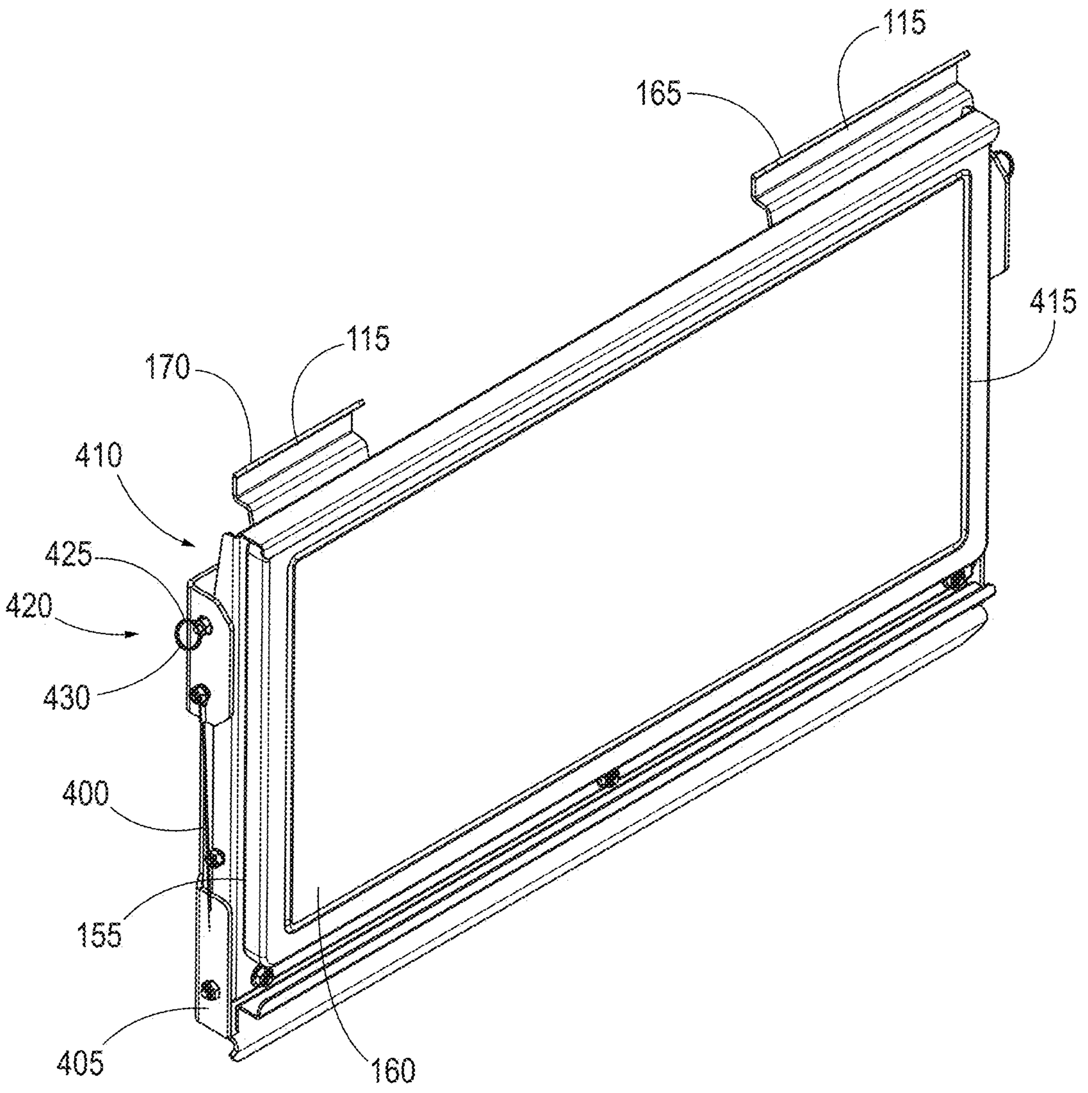
FIG. 4 is a front perspective view of the table.
Figure 5:
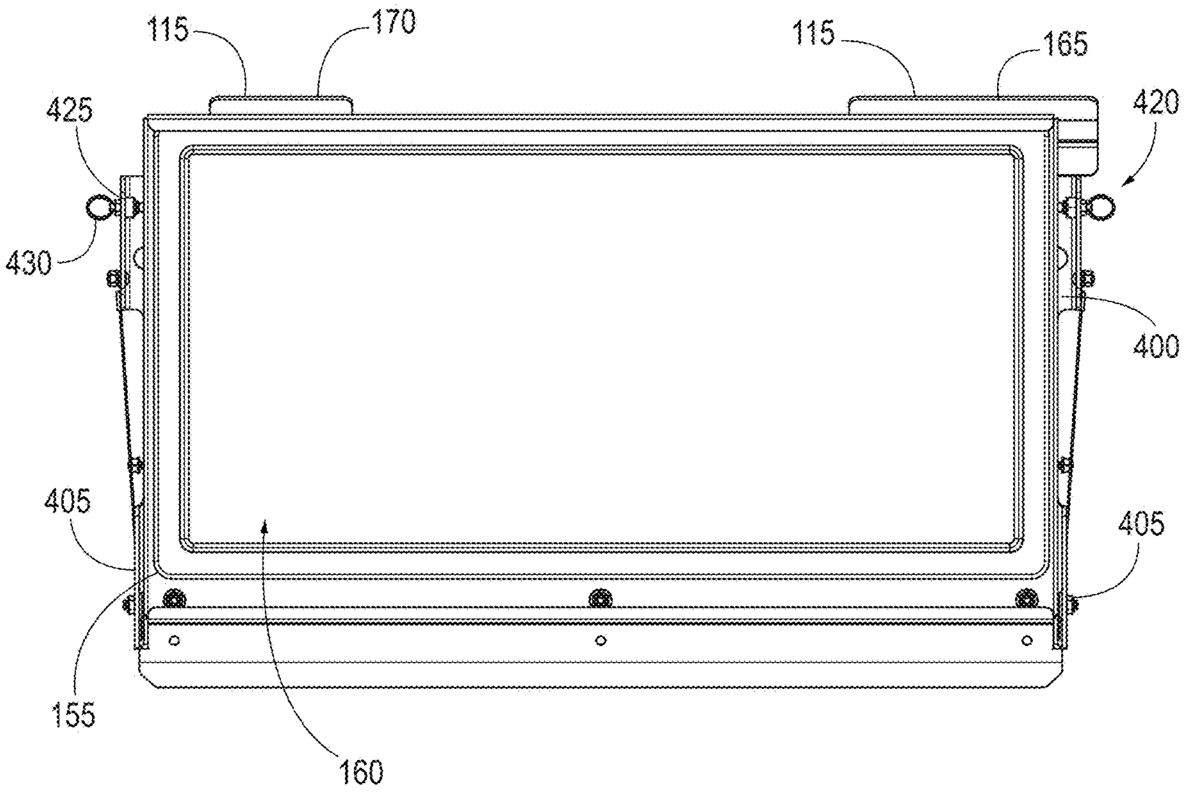
FIG. 5 is a front view of the table.

FIGS. 4 and 5 respectively illustrate the front perspective and front view of the table 155 in a folded position. In this example, the brackets 115 include the door facing bracket 165 and the tailgate facing bracket 170, but the table 155 in other examples can include different combinations of brackets 115. The attachment 120 includes a back plate 400 that rests on the side panel 140 of the vehicle 105. The table 155 includes one or more hinges 405 that promote folding of the table 155. The attachment 120 or back plate 400 acts as a base for a variety of user equipment 410. In one example, the user equipment 410 includes a tray table 415 that is pivotally coupled to the back plate 400 via the hinges 405. The back plate 400 further includes one or more locking mechanisms 420 to keep the table 155 in a folded position. In one example, the locking mechanism 420 includes one or more locking pins 425. Each of locking pins 425 includes a ring grip 430 to allow the user to grip the locking mechanism 420. In one form, the locking pin 425 is spring biased to automatically lock with the tray table 415. When the locking pins 425 are released, the tray table 415 can be unfolded relative to the back plate 400 so as to assume the unfolded position illustrated in FIG. 1. Once the tray table 415 is folded back against the back plate 400, the locking pins 425 retain the table 155 in the folded position.

Figure 6:
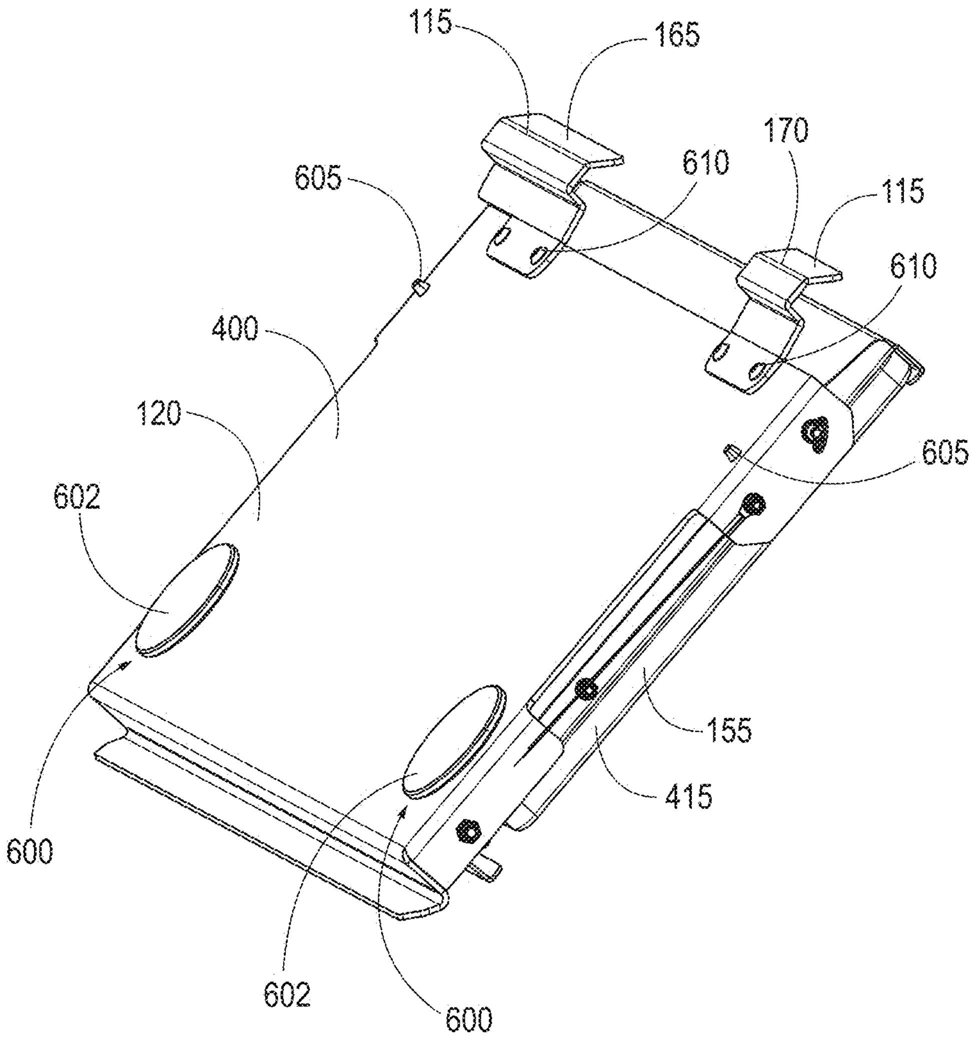
FIG. 6 is a rear perspective view of the table.
Figure 7:
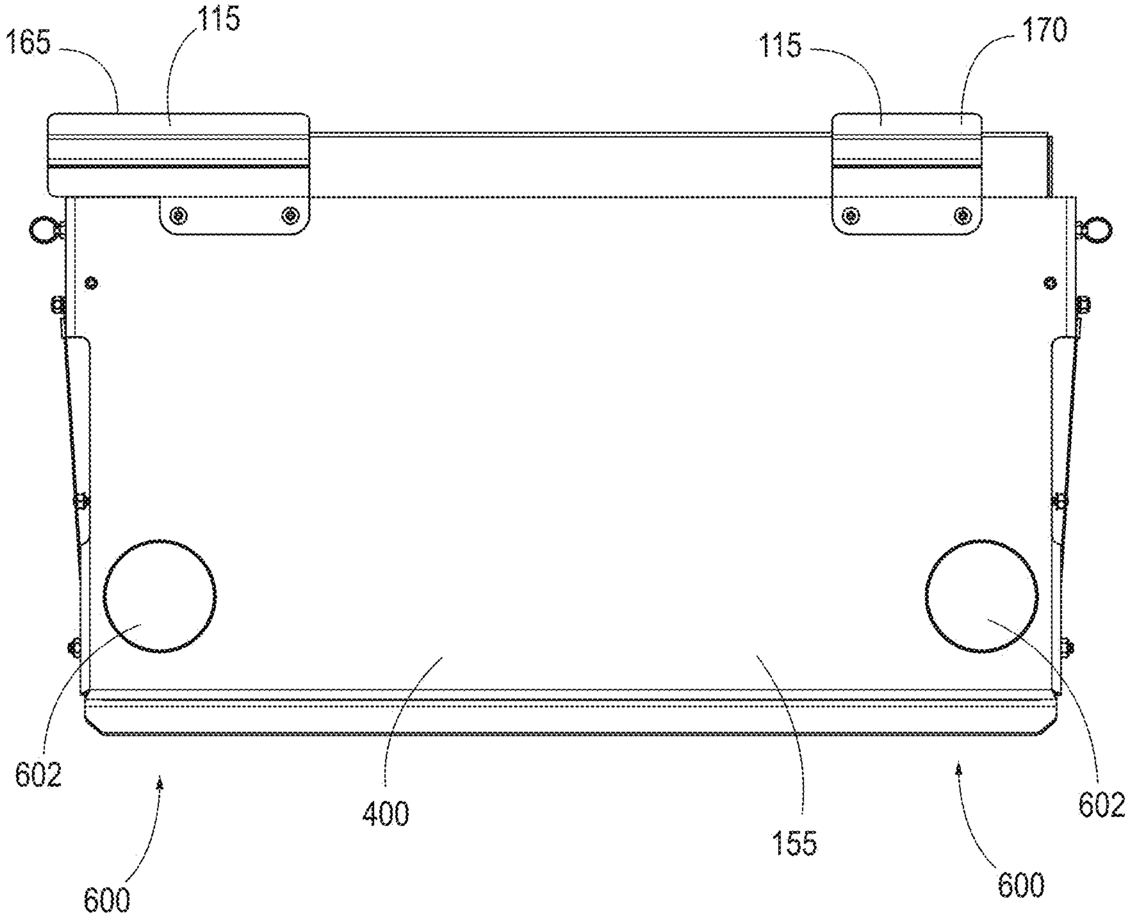
FIG. 7 is a rear view of the table.

FIGS. 6 and 7 respectively illustrate a rear perspective and rear view of the table 155 and the brackets 115. In one example, the back plate 400 has a generally flat surface. In other examples, the surface of the back plate 400 can be shaped to conform to the shape of the side panel 140 of the vehicle 105. The back plate 400 includes one or more vehicle couplers 600. The vehicle couplers 600 secure the back plate 400 to the surface of the side panel 140 of the vehicle 105. In one form, the vehicle couplers 600 include one or more magnets 602 that are magnetically secured to the side panel 140 of the vehicle 105. The vehicle couplers 600 can take other forms in other examples. For instance, the vehicle couplers 600 can include one or more suction cups, adhesive pads, and/or hook and loop fasteners. In one example, the vehicle couplers 600 are located distally away from the brackets 115 to prevent the back plate 400 from rotating toward the brackets 115 and away from the vehicle 105 when mounted. The back plate 400 further includes one or more bumpers 605. The bumpers 605 prevent the back plate 400 from coming into contact with the surface of the vehicle 105. In one example, the bumpers 605 are placed near the brackets 115. In one example the bumpers 605 are made of rubber, and the vehicle couplers 600 and bumpers 605 are placed near the four corners of the back plate 400 to prevent any surface of the back plate 400 from coming into contact with the vehicle 105. The brackets 115 are secured to the back plate 400 with one or more fasteners 610. In one example, the fasteners 610 are a nut and bolt. It should be appreciated that other methods such as welding can be used to couple the brackets 115 and back plate 400.

Figure 8:
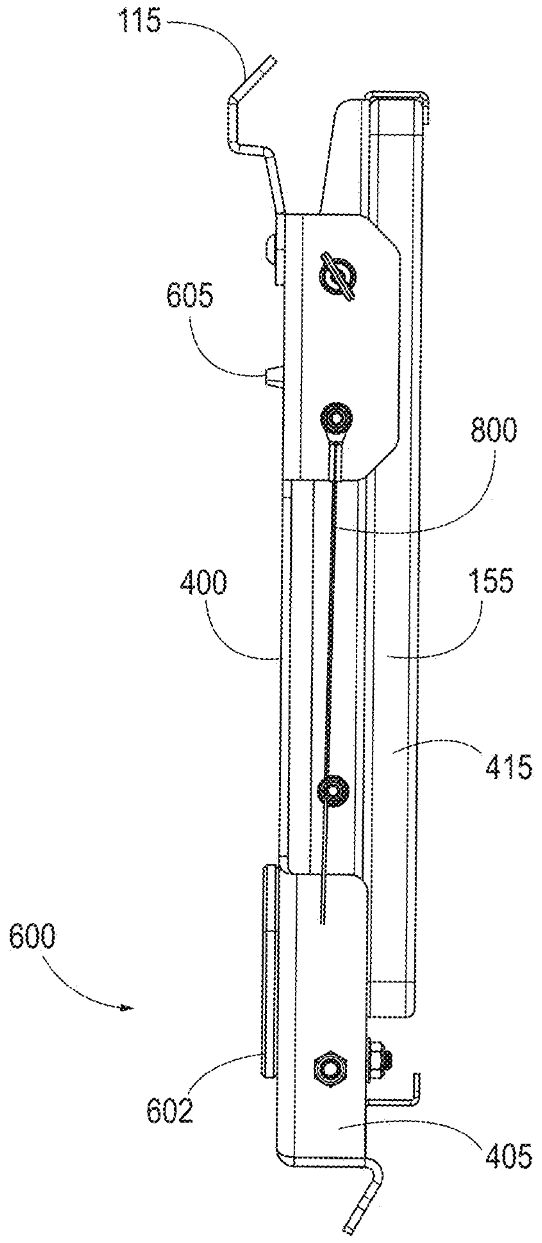
FIG. 8 is a side view of the table.

FIG. 8 illustrates a side view of the table 155. Once more, the tray table 415 is pivotally coupled to the back plate 400 via the hinges 405. In one example, the hinges 405 are configured to hold the tray table 415 generally perpendicular to the back plate 400. In another example, the back plate 400 is coupled to the user equipment 410 with a wire 800 to fold the tray table 415 generally perpendicular to the back plate 400. The wire 800 prevents the user equipment 410 from over extending. In one example, the wire 800 is made out of a metal. In other examples, the wire 800 can be polymer based. In one example, the vehicle couplers 600 (e.g., the magnets 602) and the bumpers 605 protrude from the back plate 400 at an equal distance. In other examples, the vehicle couplers 600 and bumpers 605 can protrude from the back plate 400 at a distance needed to accommodate the shape of the surface of the vehicle 105.

Figure 9:
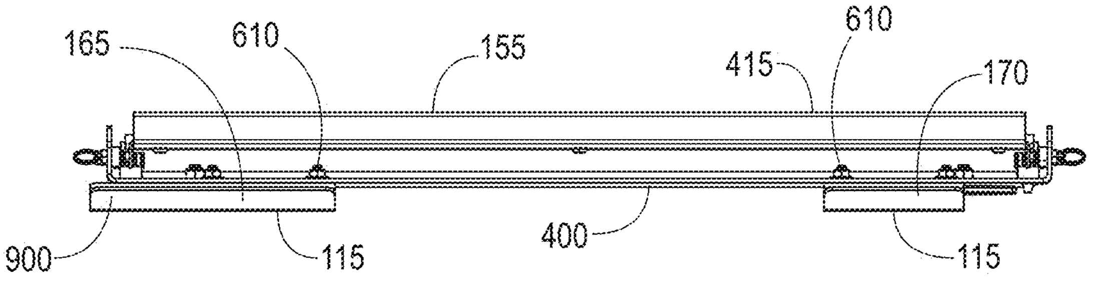
FIG. 9 is a top view of the table.

FIG. 9 illustrates a top view of the brackets 115 and the table 155. The table 155 in the depicted example includes the door facing bracket 165 and the tailgate facing bracket 170. In the illustrated example, the door facing bracket 165 has a stopper 900 that extends outwardly from the door facing bracket 165 past the edge of the table 155. When the door facing bracket 165 is mounted in the channel 305 of the track 110, the stopper 900 prevents the door 111 from coming into contact with the table 155 during operation of the door 111.

In one example, there is a space between the surface of the back plate 400 facing away from the vehicle 105 and the surface of the user equipment 410 facing toward the vehicle 105 when the system 100 is in a folded position. The space accommodates fasteners 610 that protrude from the surface of the back plate 400.

Figure 10:
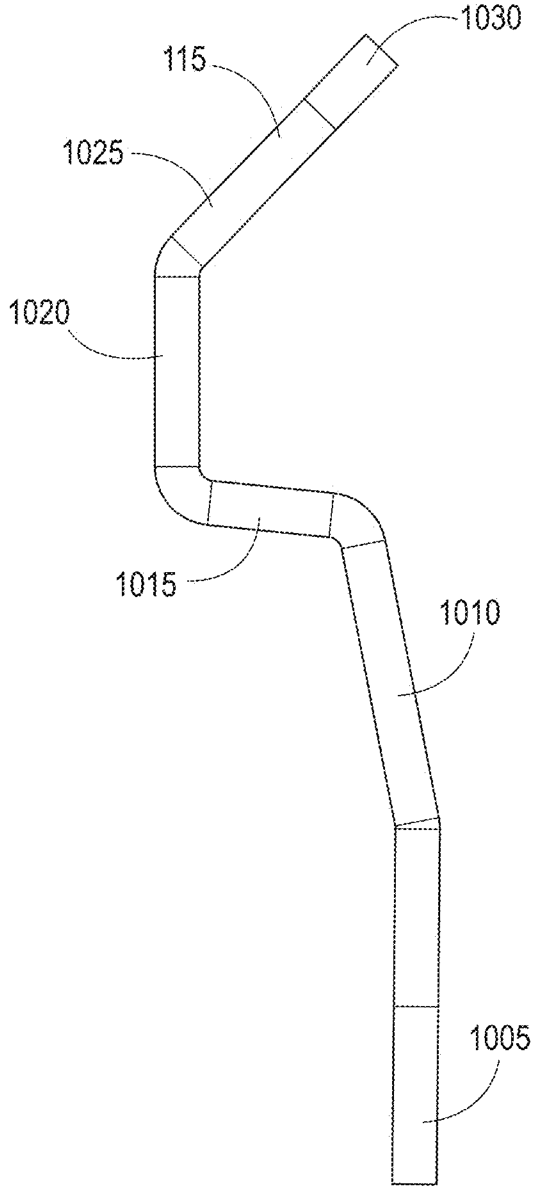
FIG. 10 is a side view of the brackets.

FIG. 10 shows the side view of one example of the bracket 115. In one example, the bracket 115 is made out of metal, such as steel or aluminum, but the bracket 115 can be made from other types of materials. Both the door facing bracket 165 and the tailgate facing bracket 170 have the same shape in profile. As shown, the bracket 115 has a mount flange 1005 where the fastener 610 secures the bracket 115 to the rest of the table 155. The bracket 115 has a connector flange 1010 extending from the mount flange 1005 that is angled to compensate for different shapes or profiles of the side panel 140. The bracket 115 has a support flange 1015 that extends from the connector flange 1010. In the depicted example, the support flange 1015 extends at an obtuse angle relative to the connector flange 1010. The support flange 1015 is configured to generally support the weight of the mounted object 113 against the load flange 315 of the track 110. The bracket 115 further has a brace flange 1020 that extends from the support flange 1015. In one form, the brace flange 1020 extends generally perpendicular to the support flange 1015. When the bracket 115 is mounted to the track 110, brace flange 1020 generally faces or rests against the mount wall 335 of the track 110. The brackets 115 further has an insertion flange 1025 extending from the brace flange 1020 at an angle of around 45 degrees relative to the plane of the brace flange 1020. Opposite to the brace flange 1020, the insertion flange 1025 has a contact ridge 1030.

Figure 11:
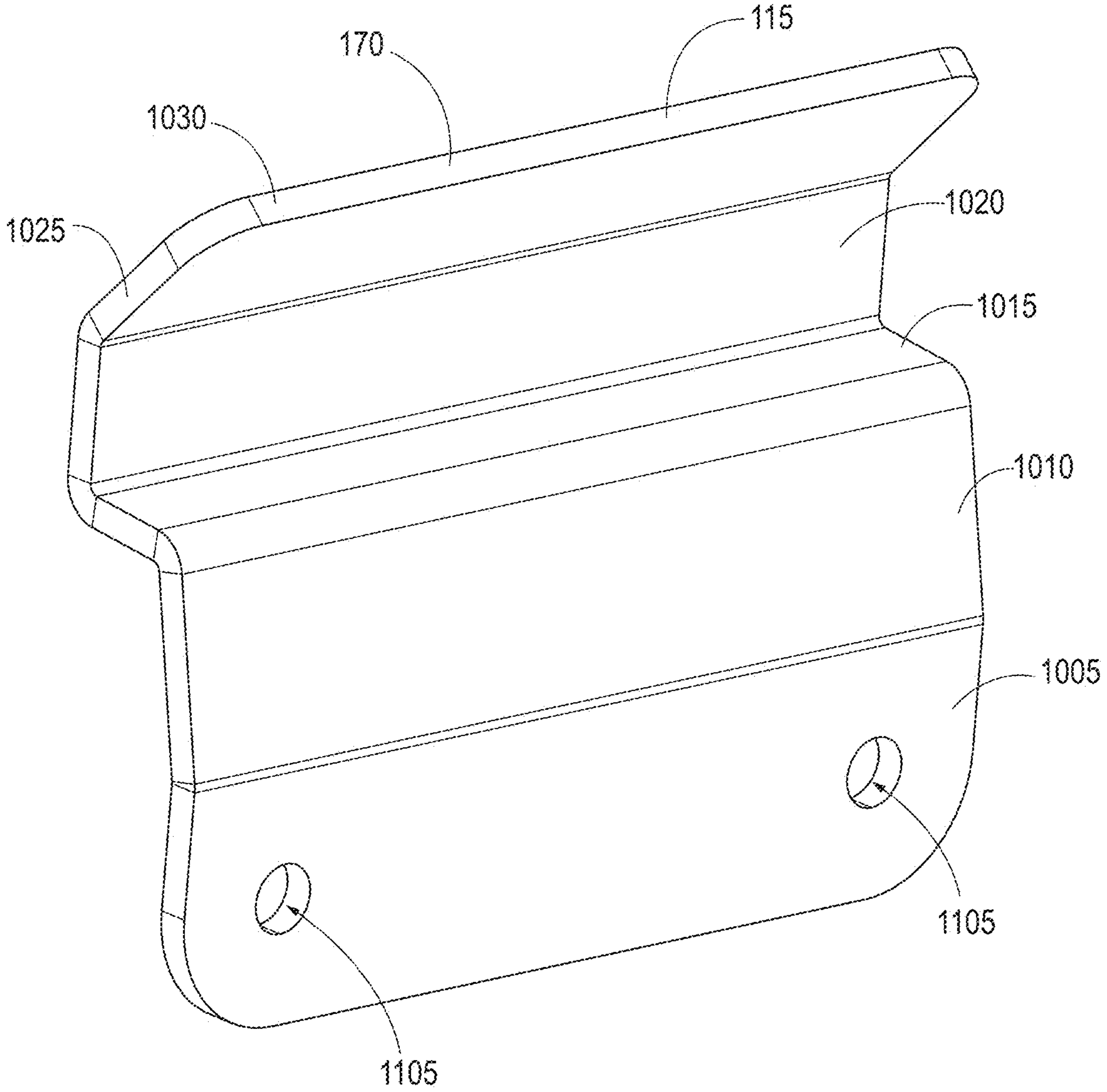
FIG. 11 is a front perspective view of a tailgate facing bracket.
Figure 12:
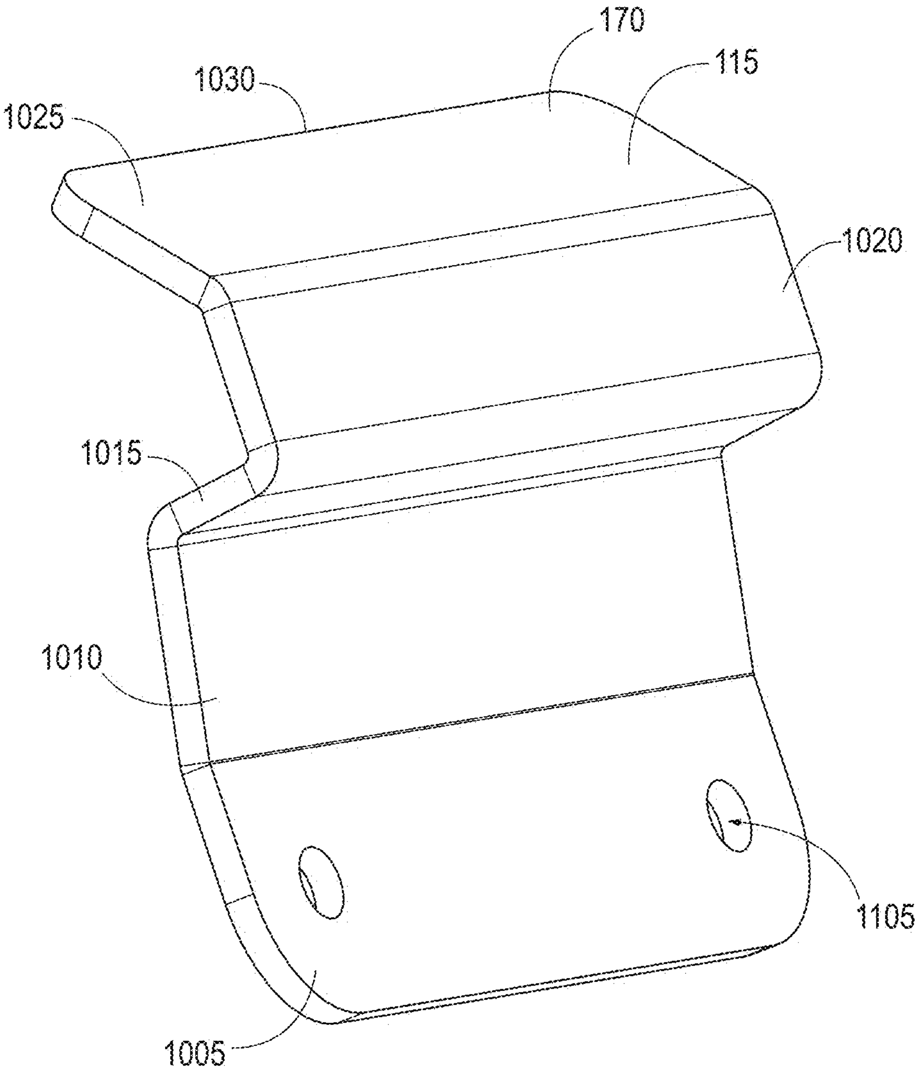
FIG. 12 is a rear perspective view of the tailgate facing bracket.

FIGS. 11 and 12 respectively illustrate a front and rear perspective view of the tailgate facing bracket 170. As noted before, the tailgate facing bracket 170 has the same profile as the bracket 115 shown in FIG. 10. As can be seen, the tailgate facing bracket 170 has the mount flange 1005, the connector flange 1010, the support flange 1015, the brace flange 1020, and the insertion flange 1025 with the contact ridge 1030. The mount flange 1005 defines one or more mount holes 1105 configured to receive the fasteners 610 for coupling the attachment 120 to the brackets 115. In one example, a nut and bolt is used to couple the attachment 120 to the brackets 115.

Figure 13:
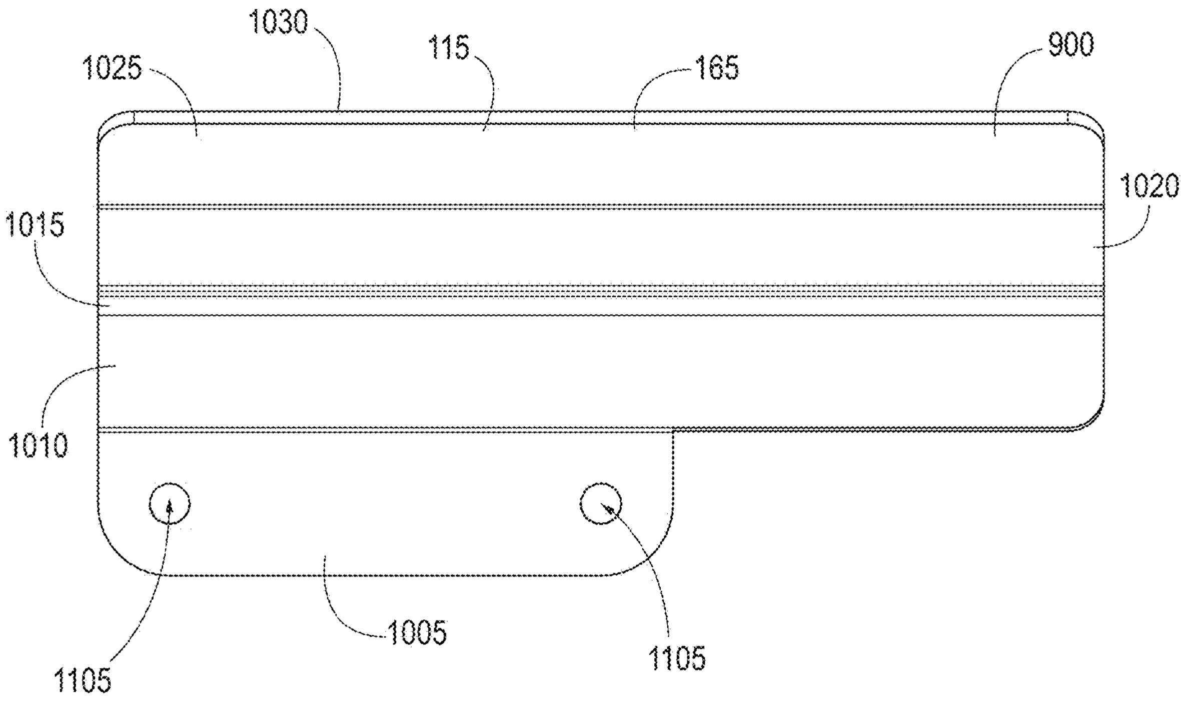
FIG. 13 is a front view of a door facing bracket.
Figure 14:
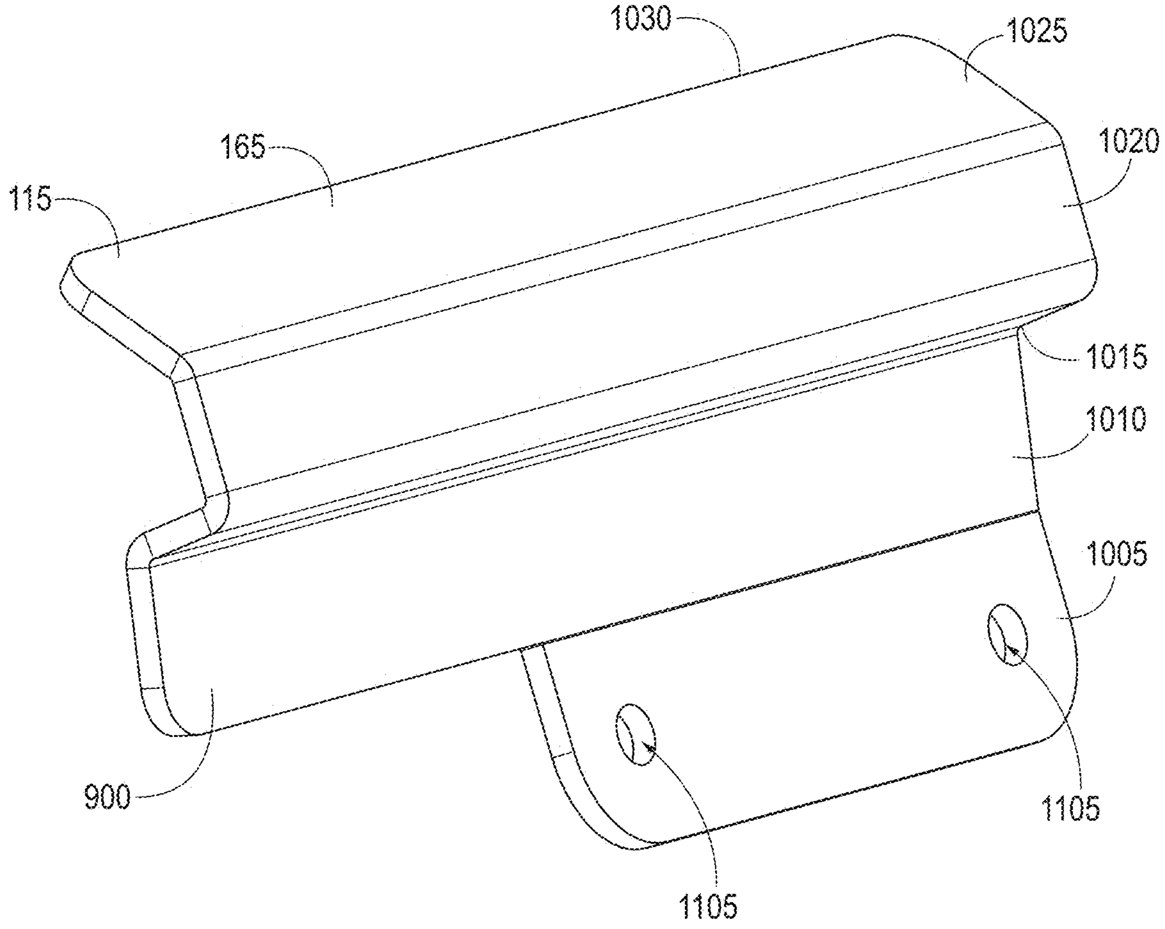
FIG. 14 is a rear perspective view of the door facing bracket.

FIGS. 13 and 14 respectively illustrate a front view and rear perspective view of the door facing bracket 165. As noted before, the door facing bracket 165 has the same profile as the bracket 115 shown in FIG. 10. As can be seen, the door facing bracket 165 has the mount flange 1005, the connector flange 1010, the support flange 1015, the brace flange 1020, and the insertion flange 1025 with the contact ridge 1030. The mount flange 1005 defines one or more mount holes 1105 configured to receive the fasteners 610 for coupling the attachment 120 to the brackets 115. In one example, a nut and bolt is used to couple the attachment 120 to the brackets 115. In this example, the door facing bracket 165 has the stopper 900 that extends from one side, but in other examples, the stoppers 900 can extend from both sides. As can be seen, the stopper 900 is formed with the connector flange 1010, the support flange 1015, the brace flange 1020, and the insertion flange 1025 which are the parts of the door facing bracket 165 that are received in the channel 305 of the track 110. Once more, the stopper 900 is configured to stop the sliding door 111 from crashing into the table 155 or other mounted object 113.

Figure 15:
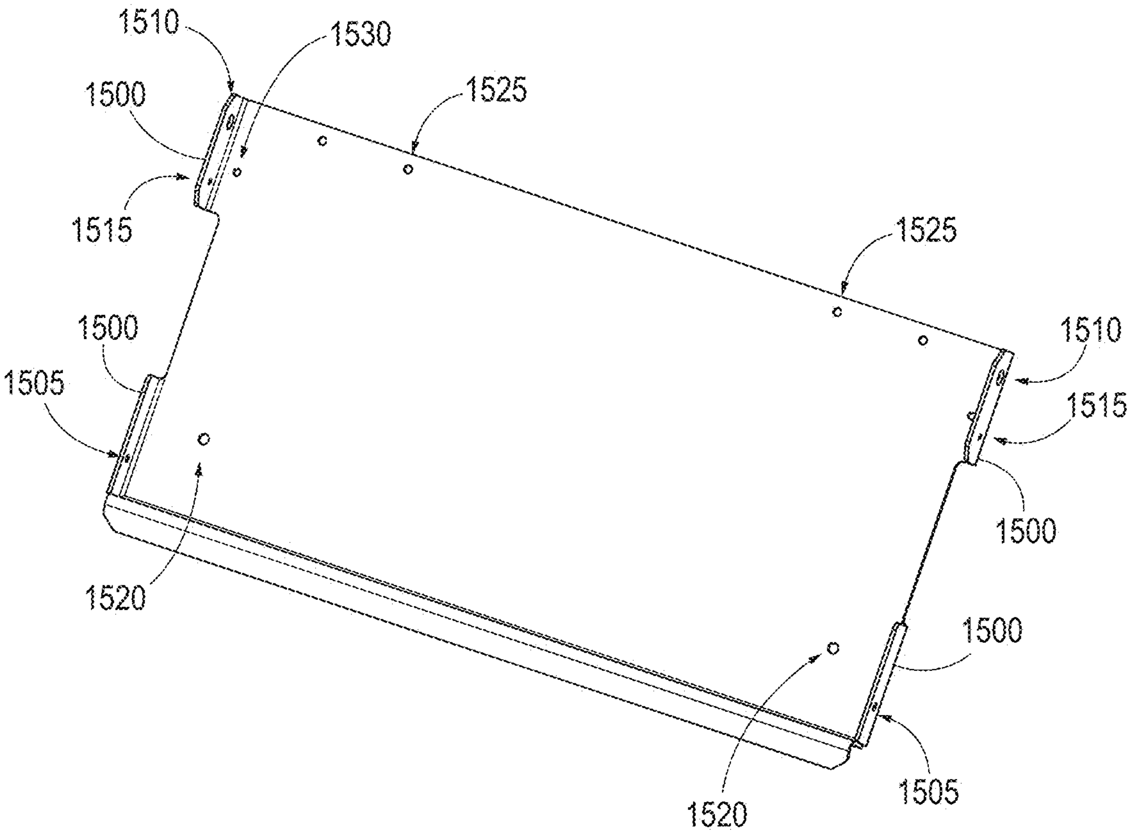
FIG. 15 is a front perspective view of a back plate used in the table.
Figure 16:
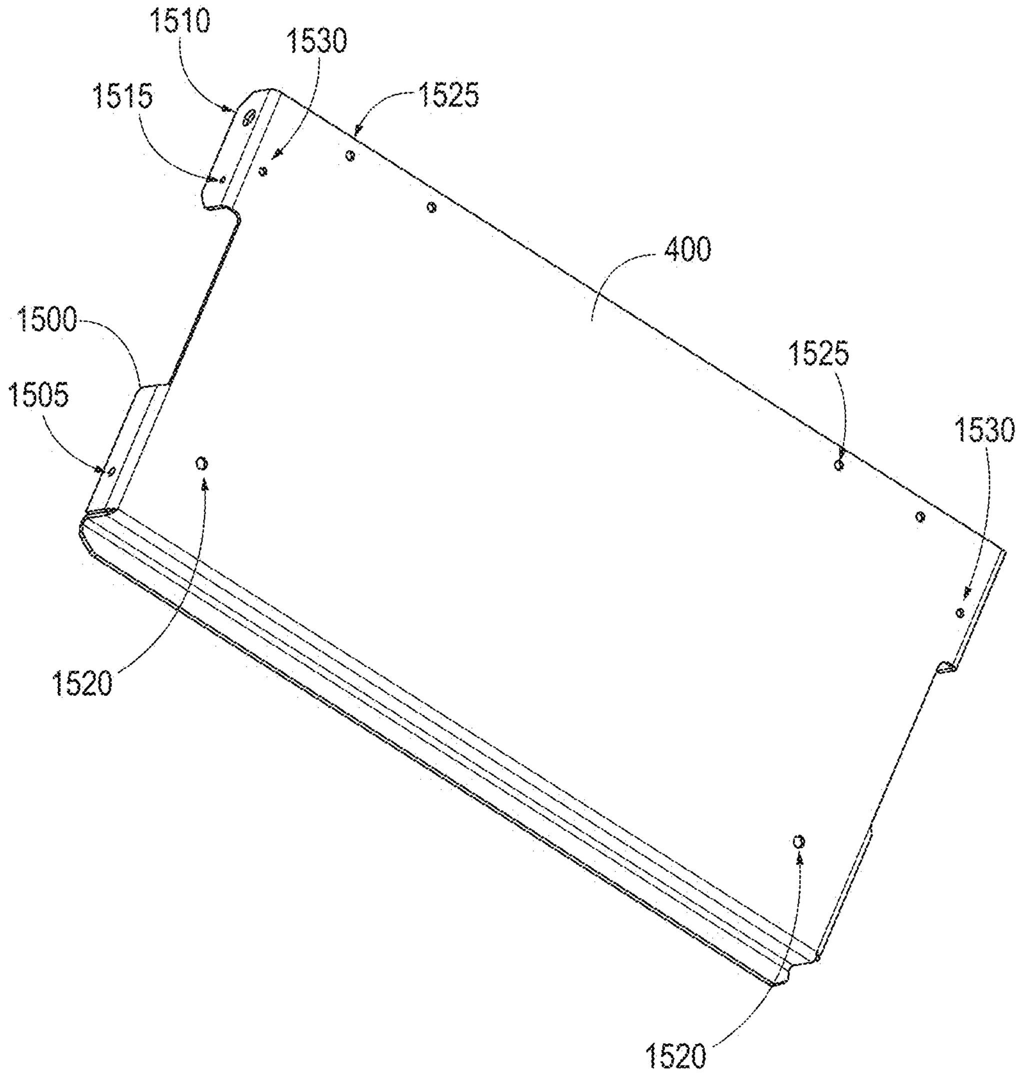
FIG. 16 is a rear perspective view of the back plate.

FIGS. 15 and 16 respectively illustrate a front and rear perspective view of the back plate 400. In one example, the back plate 400 is made out of metal. In one example, the back plate 400 includes one or more protruding sides 1500. The protruding sides 1500 include a hinge hole 1505, a lock hole 1510, and a wire hole 1515. The hinge hole 1505 couples the back plate 400 with the user equipment 410. In one example a bolt is used to couple the back plate 400 and user equipment 410. Two opposing hinge holes 1505 are located at the end of the back plate 400 to create a hinge in which the user equipment 410 can fold in and out of the back plate 400. The lock hole 1510 is used to lock the user equipment 410 in its folded position with the use of locking pins 425. Two opposing lock holes 1510 lock the user equipment 410 into place by pushing pins into the lock hole 1510, preventing rotation of the user equipment 410. The wire hole 1515 prevents the user equipment 410 from over extending and keeping the position in a place convenient for use by the user. Two opposing wire holes 1515 couple the wire 800 from the wire hole 1515 to the user equipment 410 using a bolt. The wire 800 has a length necessary to keep the user equipment 410 in a flat position. The protruding sides 1500 further include a gap 1516 to accommodate the wires 800 and one or more fasteners 610 extending out of the user equipment 410.

The back plate 400 further includes a plurality of holes on the front and back surface. For example, the back plate 400 includes one or more adhesive holes 1520, bracket attachment holes 1525, and bumper holes 1530. The adhesive holes 1520 provide a spot for the vehicle couplers 600 to screw into. The bracket attachment holes 1525 provide a spot for the back plate 400 to couple to the brackets 115. In one example, bolts and nuts are used to couple the back plate 400 to the brackets 115. The bumper holes 1530 provide spots for the bumpers 605 to screw into.

Figure 17:
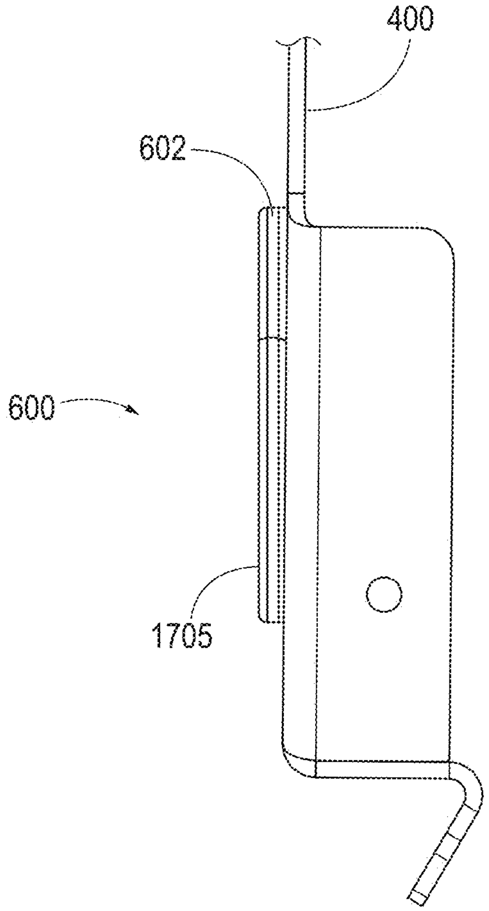
FIG. 17 is an enlarged end view of one end of the back plate.

FIG. 17 illustrates a cross-sectional side view of the back plate 400 with the vehicle coupler 600. In particular, the cross-sectional view includes the magnet 602. To prevent damage to the surface of the vehicle 105, a coating 1705 coats the surface of the magnet 602. For example, the coating 1705 can be a silicone coating. The coating 1705 will come into contact with the vehicle 105 when the system 100 is installed. The coating 1705 provides a barrier between the surface of the vehicle 105 and the magnet 602 to decrease the chance of scratching the side panel 140 of the vehicle 105.

Figure 18:
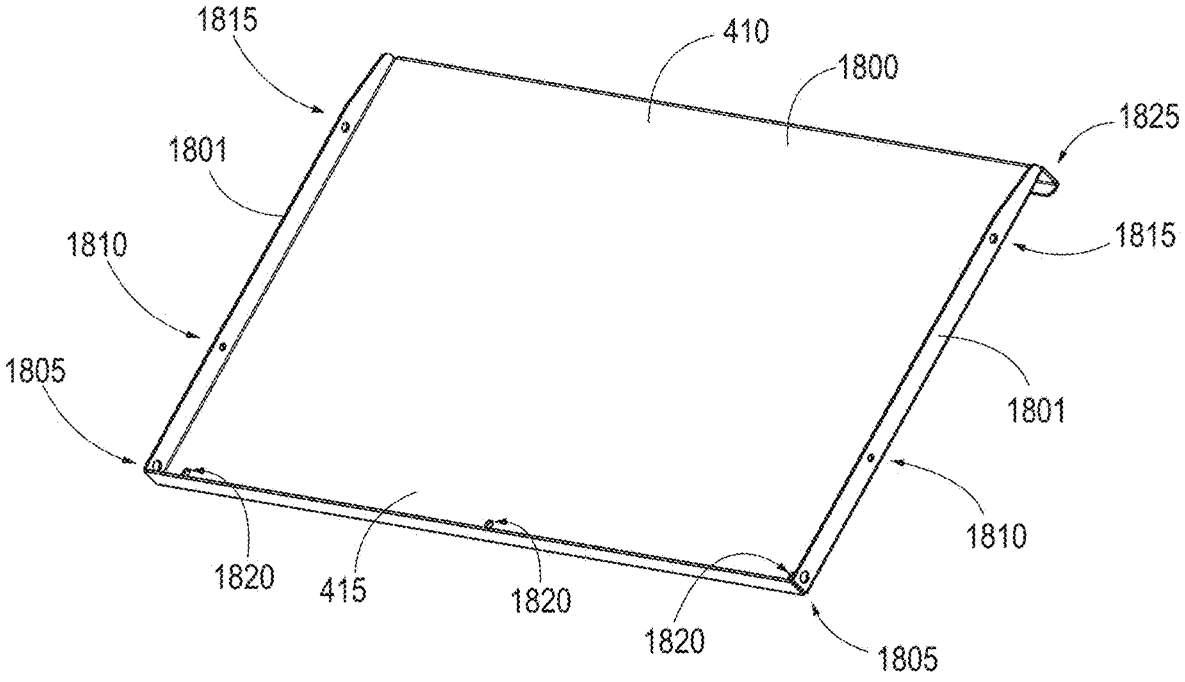
FIG. 18 is a front perspective view of a tray table used in the table.
Figure 19:
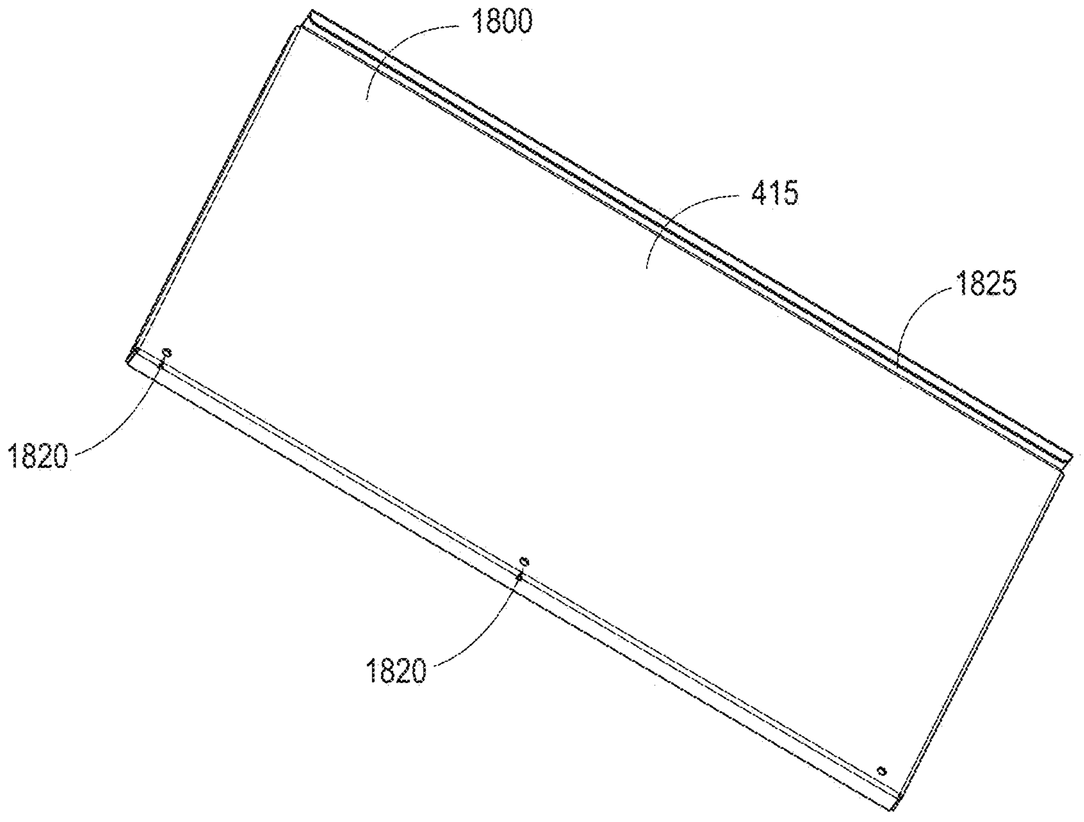
FIG. 19 is a rear perspective view of the tray table.

FIGS. 18 and 19 respectively illustrate the user equipment 410. In one example the user equipment 410 is a tray table 415. In one example the tray table 415 is made of stainless steel. The tray table 415 includes a table surface 1800. The table surface 1800 acts as a surface to place items on when used by the user. The tray table 415 further includes one or more raised sides 1801. The raised sides 1801 include tray hinge holes 1805, tray wire holes 1810, and tray pin holes 1815. Two opposing tray hinge holes 1805 act as hinges with the use of a bolt coupled to the back plate 400. The tray hinge holes 1805 let the tray table 415 rotate in and out of the back plate 400. Two opposing tray wire holes 1810 couple to the wire 800 to prevent the tray table 415 from over extending in relation to the back plate 400. Two opposing tray pin holes 1815 lock the tray table 415 into place when in the folded position by accommodating the locking pins 425. The tray table 415 further includes a plurality of slide bar holes 1820. The slide bar holes 1820 accommodate a detachable tray lip. The detachable tray lip attaches on the opposing end of a fixed tray lip 1825. The fixed tray lip 1825 and detachable tray lip create a slot for a board to slide in and out of. For example, a cutting board can be inserted into the slot.

Figure 20:
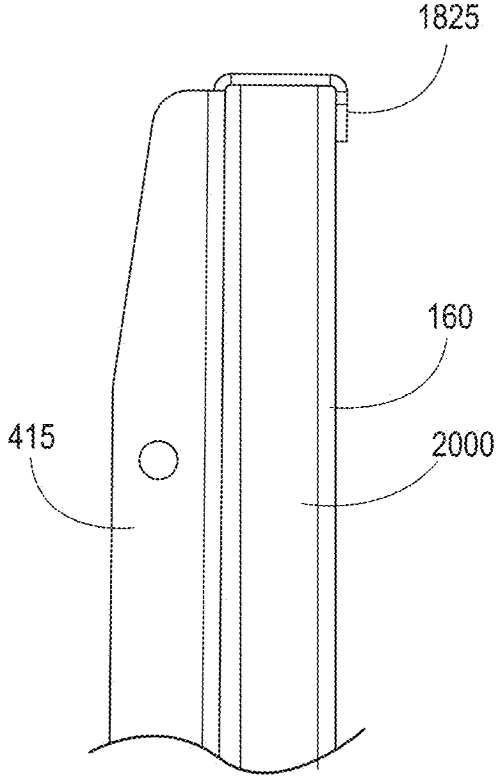
FIG. 20 is an enlarged view of the tray table.

FIG. 20 illustrates a cut off view of the tray table 415. The fixed tray lip 1825 is shown with the cutting surface 160 inserted into place. In the depicted example, the cutting surface 160 includes a cutting board 2000. The cutting board 2000 slides in and out of the tray table 415 by resting on top of the fixed tray lip 1825.

Figure 21:
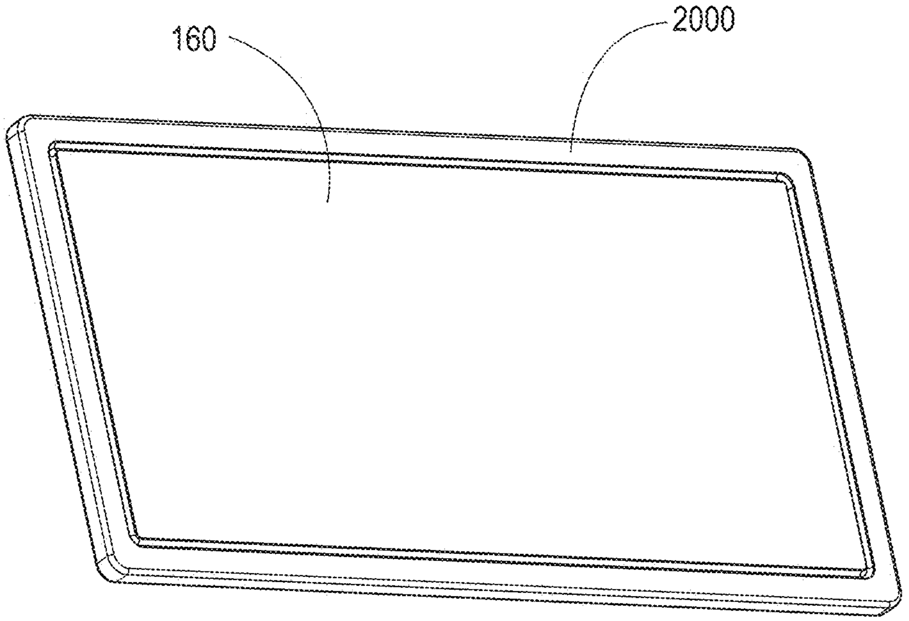
FIG. 21 is a front perspective view of a sliding cutting board used in the table.

FIG. 21 illustrates a perspective view of the cutting board 2000. In one example, the cutting board 2000 is made out of wood. In other examples, the cutting board 2000 is made of plastic or bamboo.

Figure 22:
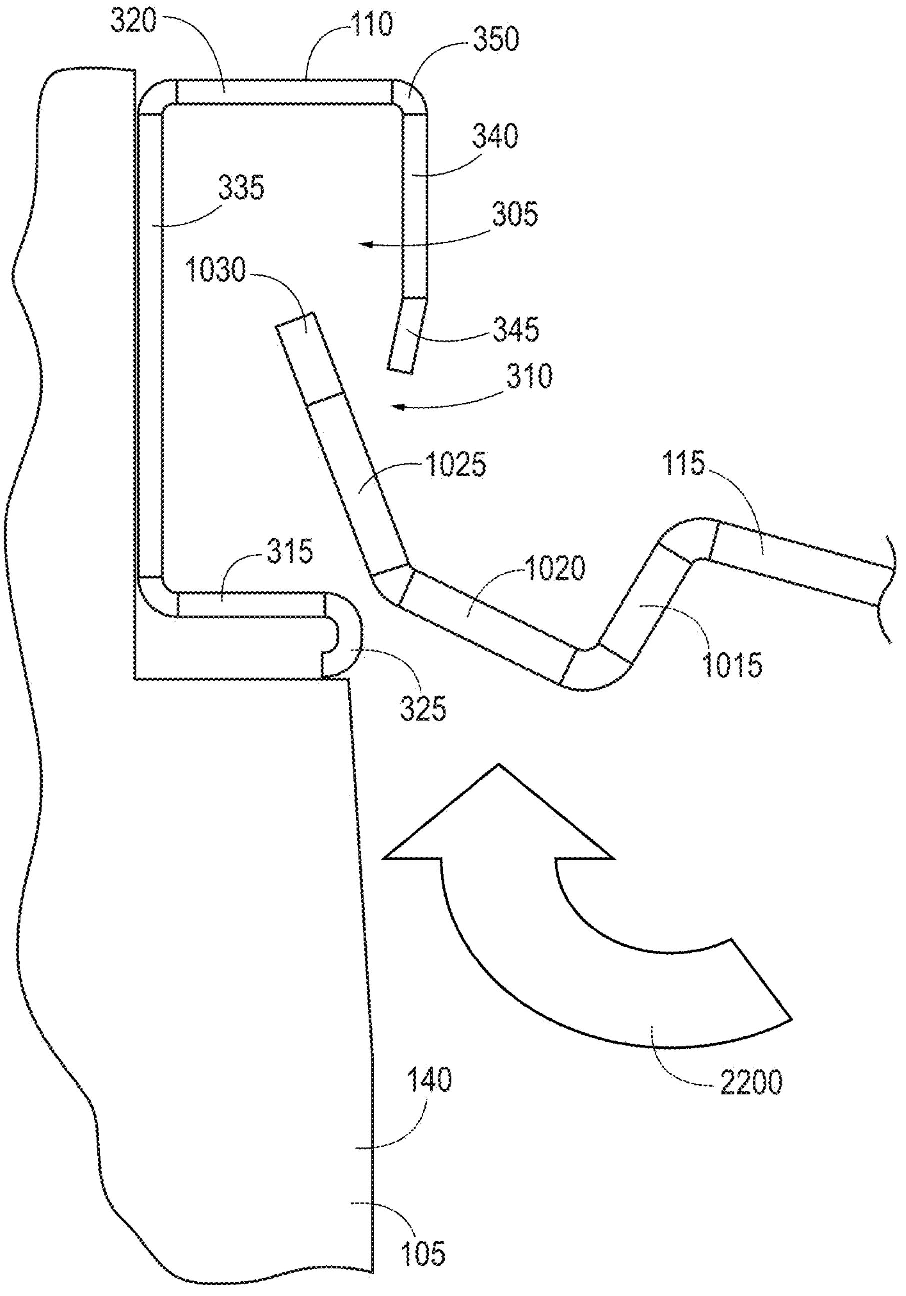
FIG. 22 is a cross-sectional view of the brackets during mounting of the bracket into the track of the vehicle.

FIG. 22 shows the track 110 and the bracket 115 during mounting. As shown, the contact ridge 1030 of the insertion flange 1025 is inserted into the channel 305 of the track 110 via the slot 310. Upon the bracket 115 being inserted farther into the channel 305 of the track 110, the bracket 115 is rotated in the direction indicated by arrow 2200 in FIG. 22.

Figure 23:
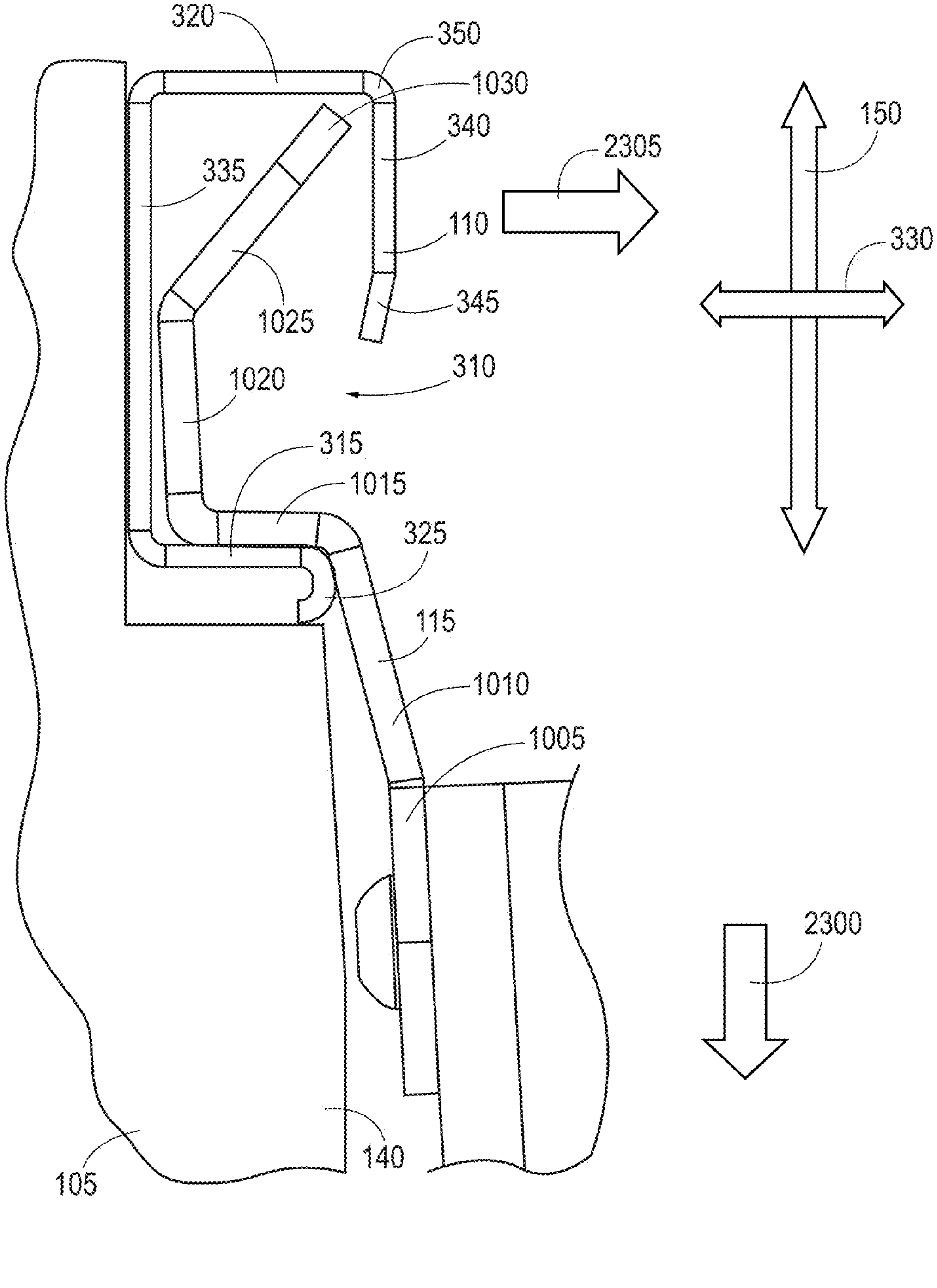
FIG. 23 is a cross-sectional view of the brackets when the bracket is mounted in the track of the vehicle.

FIG. 23 shows the bracket 115 when mounted into the track 110. Due to gravity, the table 155 or other object 113 pulls in a downwards direction as is indicated by arrow 2300. The support flange 1015 applies most of this force via the support flange 1015 of the bracket 115 onto the load flange 315 of the track 110. Again, the load flange 315 is typically designed to support at least some of the weight of the sliding door 111. The brackets 115 generally mimic the forces applied by the sliding door mechanism 108.

In at least one variation, the bracket 115 is designed to minimize or avoid applying a significant lateral force as indicated by arrow 2305 in FIG. 23, or worse yet, a bending moment, against the lateral guide flange 340. In one form, the bracket 115 has an angled insertion flange 1025 that is typically the first part of the bracket 115 inserted into the channel 305 of the track 110 when mounting to the track 110. The insertion flange 1025 of the bracket 115 is oriented at an angle that is transverse to the lateral guide flange 340. The end of the insertion flange 1025 has a contact ridge 1030 that is positioned proximally to the base or base 350 of the lateral guide flange 340 where the lateral guide flange 340 is stronger. When a lateral outward pulling force as indicated by arrow 2305 (i.e., away from the side 109 of the vehicle 105) is applied to the object 113 held by the mounting system 112, the contact ridge 1030 of the angled insertion bracket 115 is pushed into the bend radius or base 350 of the lateral guide flange 340.

Due to the angle of the insertion flange 1025, some of the lateral force may occasionally cause the bracket 115 to very slightly spread apart vertically so as to create a vertical clamping force in the track 110 of channel 305. However, most of the lateral force is typically converted into rotational motion of the bracket 115. The engagement of the contact ridge 1030 of the insertion flange 1025 of the bracket 115 with the base 350 of the lateral guide flange 340 forms a pivot axis about which the bracket 115 and mounted object 113 pivots. This pivoting motion requires considerable lifting force to vertically raise the mounted object 113. In other words, the lateral motion needs to provide considerable kinetic energy so as to raise the relatively heavy mounted object 113 from a lower potential state to a higher potential state (i.e., to a higher position from the ground). In most cases, the inertial state of the mounted object 113 prevents any significant rotational movement or raising of the object 113 from the ground. In some variations, the folding table 155 or other mounted object 113 includes a vehicle 105 panel coupler, such as one or more magnets 602, that secures an end or side 109 of the object 113 to the vehicle 105 at a location that is distal from the pivot axis of the mounting bracket 115. The resulting large moment arm further resists any significant rotational movement. As a consequence, the lateral guide flange 340 of the track 110 experiences very little lateral or bending forces such that the track 110 remains undamaged when small or common lateral pulling forces are applied to the mounted object 113 like the folding table 155.

Even when the mounted object 113 experiences a relatively large lateral force relative to the vehicle 105, the track 110 will generally remain undamaged. Instead, the mounting system 112 will dismount or disengage from the track 110 before causing significant damage to the track 110. When a large force is applied, the mounted object 113 and bracket 115 will pivot about the rotational axis at the engagement between the contact ridge 1030 of the insertion flange 1025 of the bracket 115 and the base 350 of the lateral guide flange 340 of the track 110. In such a case, the bracket 115 continues to rotate until the bracket 115 reaches the dismounting position. At the dismounting position, the bracket 115 disengages from the track 110 and the object 113 falls down onto the ground. The insertion flange 1025 is angled such that the bracket 115 disengages before the angled insertion flange 1025 contacts and bends the lateral guide flange 340 of the track 110. This helps preserve the track 110 of the vehicle 105 at the possible expense of damage of the fallen object 113. In most cases, this cost is justified by the high cost of sliding door 111 repairs.

Figure 24:
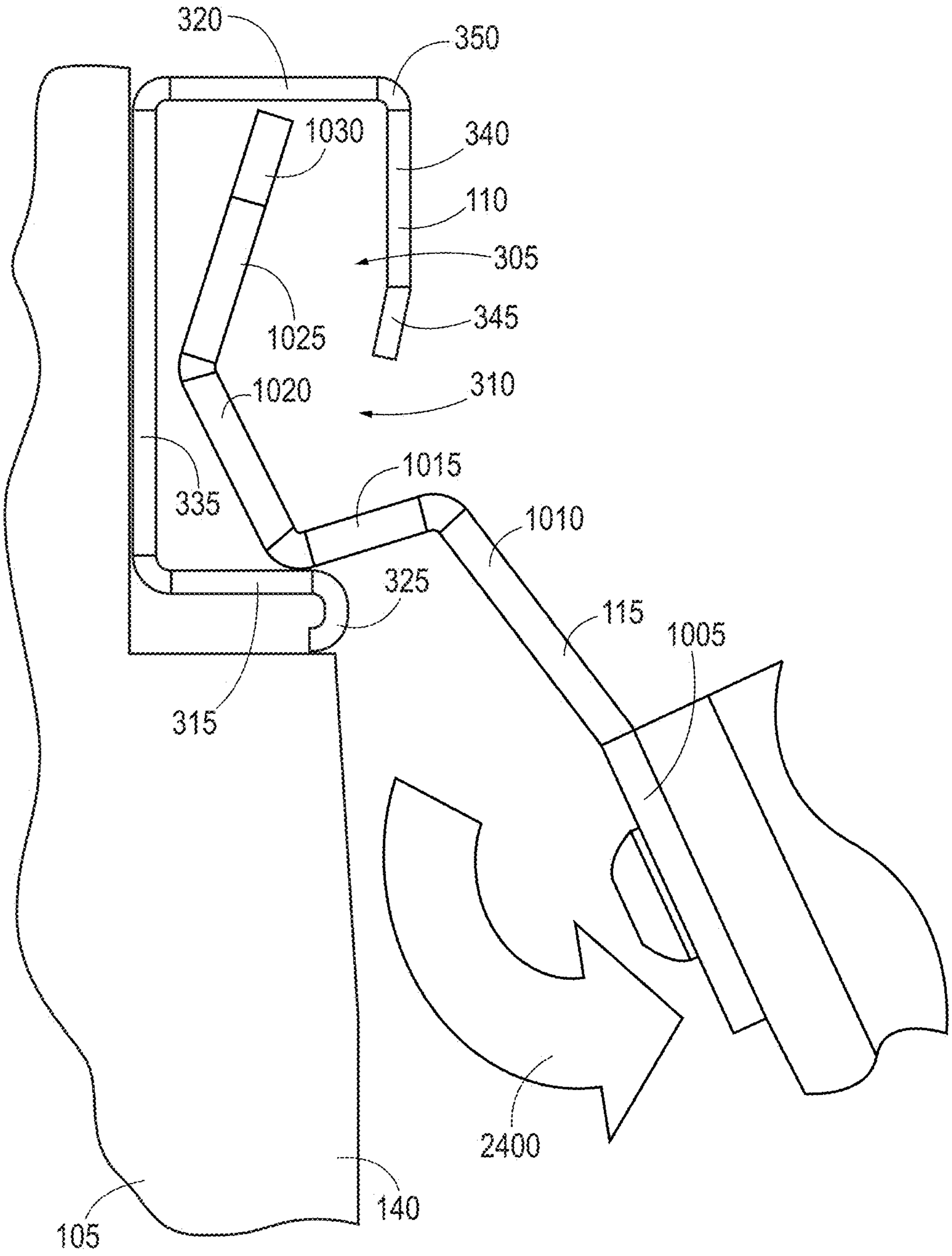
FIG. 24 is a cross-sectional view of the brackets during dismounting of the bracket from the track of the vehicle.

FIG. 24 shows the track 110 and the bracket 115 during dismounting. As shown by arrow 2400, the bracket 115 during dismounting is rotated in the opposite manner as depicted in FIG. 22 (i.e., during mounting). The bracket 115 is removed from the channel 305 of the track 110 through the slot 310.

Figure 25:
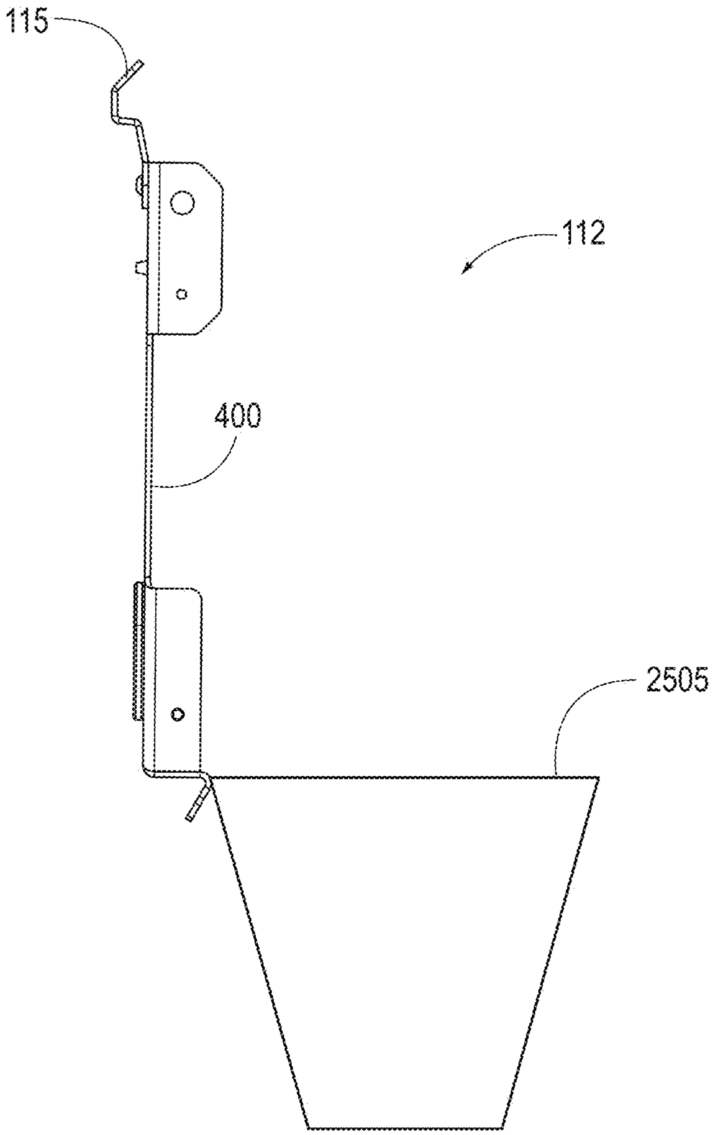
FIG. 25 is a side view of a mounting system for a trash bag holder.

FIG. 25 shows a side view of the mounting system 112 with a trash bag holder 2505 for collecting trash. The trash bag holder 2505 can be folded against the user equipment 410 when not in use.

Figure 26:
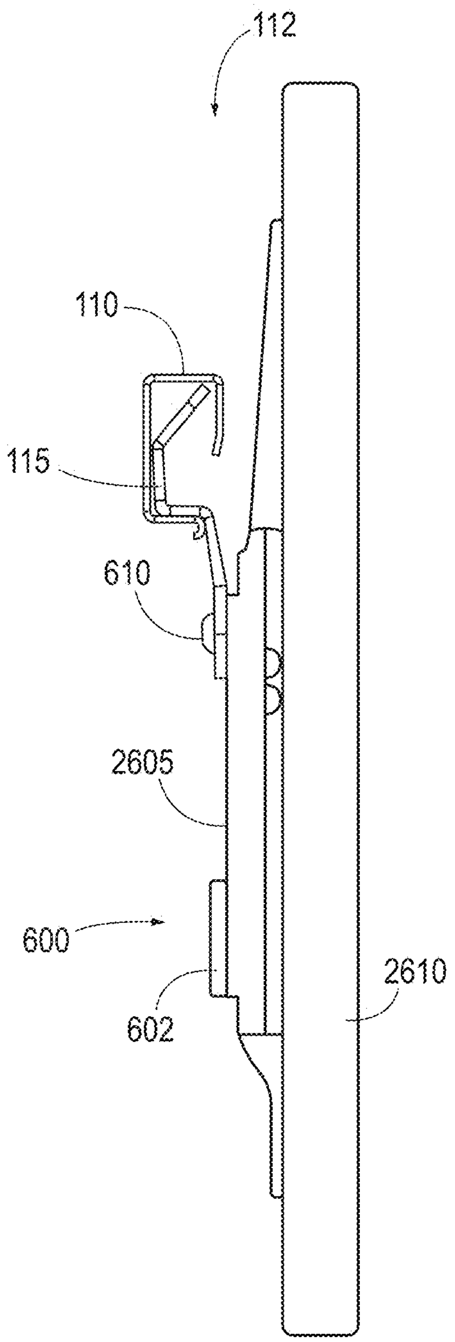
FIG. 26 is a side view of a mounting system for a television.

FIG. 26 shows a side view of the mounting system 112 configured to mount a television mount 2605 holding a television 2610. The brackets 115 are mounted to the track 110. The brackets 115 are secured to the television mount 2605 via the fasteners 610. In the illustrated example, the television mount 2605 has the vehicle couplers 600 in the form of magnets 602 for securing against the side panel 140 of the vehicle 105.

Figure 27:
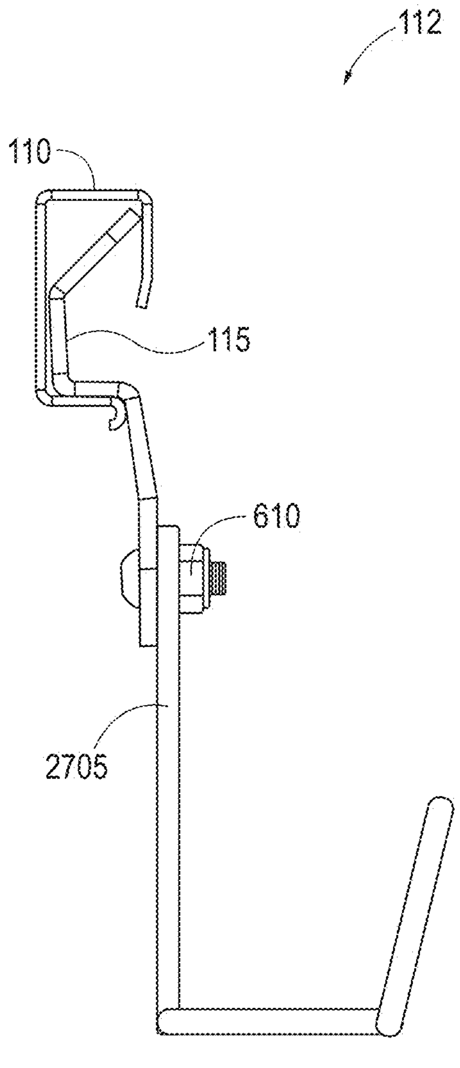
FIG. 27 is a side view of a mounting system for a hook.

FIG. 27 shows another example of the mounting system 112. In this illustrated example, the mounting system 112 includes a hook 2705. The bracket 115 is connected to the hook 2705 via the fastener 610. The brackets 115 are mounted to the track 110 in the same fashion as described above. The hook 2705 can be used to secure a variety of objects 113 to the vehicle 105 such as ropes, hoses, cables, tools, bicycles, and surfboards, to name just a few examples.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Adhesive" generally refers to any non-metallic substance applied to one or both surfaces of two separate parts that binds them together and resists their separation. For example, an adhesive can bond both mating surfaces through specific adhesion (e.g., molecular attraction), through mechanical anchoring (e.g., by flowing into holes in porous surfaces), and/or through fusion (e.g., partial solution of both surfaces in the adhesive or its solvent vehicle). Some non-limiting examples of adhesives include liquid adhesives, film adhesives, resin adhesives, rubber adhesives, silicone-based adhesives, mastics, metal-to-metal adhesives, plastic adhesives, rubber adhesives, sprayable adhesives, and hot melt adhesives, to name just a few.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Bracket" generally refers to a flat or curved component that forms part of another object. Typically, but not always, the bracket has a generally flat shape.

"Bumper" generally refers to a device or structure configured to absorb some shock and/or reduce damage. In one non-limiting example, the bumper includes a flexible member, such as made from an elastomeric material, that bends when a certain threshold force is applied to the bumper. In another non-limiting example, the bumper includes a pivotal member that is biased by a spring that yields when the threshold force is applied.

"Coating", generally refers to a thin layer or covering of something.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Gap" generally refers to a space between objects, surfaces, or points.

"Hinge" generally refers to a mechanical bearing or other device that connects at least two solid objects so as to allow only an angle of rotation between the objects. In one example, the objects connected by the hinge can rotate relative to each other about a fixed axis of rotation such that all other relative translations and/or rotations are prevented to provide one degree of freedom. In other examples, the hinge can provide multiple degrees of freedom. For instance, a living hinge, which is made of flexible material like plastic, can provide multiple axes of rotational freedom. In one form, the hinge includes a leaf with a knuckle that receives a pin. Some examples of hinge types include spring hinges, barrel hinges, pivot hinges, butt-mortise hinges, case hinges, piano hinges, concealed hinges, butterfly hinges, flag hinges, strap hinges, H-hinges, counter-flap hinges, self-closing hinges, friction hinges, double action hinges, and crank hinges, to name just a few.

"Hook" generally refers to a length of material that contains a portion that is curved and/or indented, such that it can be used to grab onto, connect, or otherwise attach itself onto another object. In one non-limiting example, the hook includes a piece of material, such as made of metal and/or plastic, that is curved or otherwise bent back at an angle, for catching hold of another object.

"Horizontal" generally refers to a plane and/or direction, which is parallel with the plane of the horizon. In another example, the horizontal plane and/or direction is at a right angle to a vertical plane or direction. An item that moves in the sideways (left to right) direction is generally said to move horizontally. For example, a lever fixed on one end to a rod that is able to move to the left and right is said to move horizontally. In yet another example, the slope of a horizontal line is 0.

"Lateral" generally refers to being situated on, directed toward, or coming from the side.

"Longitudinal" generally refers to the length or lengthwise dimension of an object, rather than across.

"Magnet" generally refers to a material or object that produces a magnetic field external to itself. Types of magnets include permanent magnets and electromagnets. By way of non-limiting examples, magnets in certain circumstances are able to attract (or repel) objects such as those made of iron or steel.

"Manual" generally refers work done by human hand and not via machine, tool, and/or electronics.

"Pin" or "Peg" generally refers to an elongated piece of material such as wood, metal, plastic and/or other material. Typically (but not always), the pin is tapered at one or both ends, but the pin can be shaped differently in other examples. For example, the ends of the pin can be flattened, widened, and/or bent in order to retain the pin. Pins can be used for any number of purposes. For example, the pin can be used in machines to couple components together or otherwise act as an interface between components. Pins can also be used for holding things together, hanging things on, and/or marking a position. Normally, but not always, the pin is a small, usually cylindrical piece. In certain cases, the pin is pointed and/or a tapered piece used to pin down, fasten things together, and/or designed to fit into holes. In other examples, the pin can have a polyhedral shape, such as with a rectangular or triangular cross-sectional shape, or an irregular shape.

"Table" generally refers to a flat surface, usually supported by four legs, used for putting things on.

"Track" or "Rail" generally refers to a bar fixed in position, such as to a wall or to vertical posts, used to close something off and/or act as support for an object.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, vans, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vertical" generally refers to a plane and/or direction, which is perpendicular to the plane of the horizon. In another example, vertical is an alignment where the top is directly above the bottom. An item that moves upward or downward is generally said to move vertically. For example, an item that is able to move up and down is said to move vertically. In another example, the slope of a vertical line is undefined.

"Wire" generally refers to a long thin piece of metal usually drawn out into the form of a flexible thread, strand, or slender rod.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | system |
| 105 | vehicle |
| 108 | sliding door mechanism |
| 109 | side |
| 110 | track |
| 111 | door |
| 112 | mounting system |
| 113 | object |
| 115 | brackets |
| 120 | attachment |
| 125 | middle track |
| 130 | door opening |
| 135 | rear |
| 140 | side panel |
| 145 | longitudinal axis |
| 150 | vertical axis |
| 155 | table |
| 160 | cutting surface |
| 165 | door facing bracket |

-continued

| Reference Numbers | |
|---|---|
| 170 | tailgate facing bracket |
| 305 | channel |
| 310 | slot |
| 315 | load flange |
| 320 | cover flange |
| 325 | hem |
| 330 | lateral axis |
| 335 | mount wall |
| 340 | lateral guide flange |
| 345 | flange edge |
| 350 | base |
| 355 | track notch |
| 400 | back plate |
| 405 | hinge |
| 410 | user equipment |
| 415 | tray table |
| 420 | locking mechanism |
| 425 | locking pin |
| 430 | ring grip |
| 600 | vehicle couplers |
| 602 | magnet |
| 605 | bumpers |
| 610 | fasteners |
| 800 | wire |
| 900 | stopper |
| 1005 | mount flange |
| 1010 | connector flange |
| 1015 | support flange |
| 1020 | brace flange |
| 1025 | insertion flange |
| 1030 | contact ridge |
| 1105 | mount holes |
| 1500 | protruding sides |
| 1505 | hinge hole |
| 1510 | lock hole |
| 1515 | wire hole |
| 1516 | gap |
| 1520 | adhesive hole |
| 1525 | bracket attachment hole |
| 1530 | bumper hole |
| 1705 | coating |
| 1800 | table surface |
| 1801 | raised sides |
| 1805 | tray hinge holes |
| 1810 | tray wire holes |
| 1815 | tray pin holes |
| 1820 | slide bar holes |
| 1825 | fixed tray lip |
| 2000 | cutting board |
| 2200 | arrow |
| 2300 | arrow |
| 2305 | arrow |
| 2400 | arrow |
| 2505 | trash bag holder |
| 2605 | television mount |
| 2610 | television |
| 2705 | hook |

What is claimed is:

1. A system, comprising:

a mounting system including a bracket;

wherein the bracket is configured to couple to a track of a sliding door mechanism;

a folding tray table secured to the bracket;

wherein the folding tray table includes a tray pivotally coupled to a back plate, and wherein the back plate has a magnet to couple the back plate to a vehicle panel.

2. The system of claim 1, further comprising:

a vehicle; and wherein the vehicle includes the sliding door mechanism.

3. The system of claim 2, wherein the track is a middle track.

4. The system of claim 1, wherein:

the track defines a channel;

the sliding door mechanism has one or more roller wheels received in the channel of the track;

the track has a load flange;

the load flange is configured to support the roller wheels;

the mounting system mounts an object to the track; and the bracket is configured to support the weight of the object on the load flange of the track.

5. The system of claim 1, wherein:

the track has a load flange;

the bracket has a support flange; and the support flange of the bracket is configured to rest against the load flange of the track when mounted.

6. The system of claim 1, wherein the folding tray table has a cutting board configured to slide out from at least one side of the tray.

7. The system of claim 1, wherein the magnet is covered in a coating to inhibit scuffing.

8. The system of claim 1, wherein the bracket has a stopper extending from at least one side of the bracket.

9. A system, comprising:

a track defining a channel;

a door being configured to slide along the track;

the track has a load flange;

wherein the load flange at least in part supports the weight of the door;

a bracket having a support flange;

wherein the support flange of the bracket is configured to rest against the load flange of the track when mounted;

wherein the track defines a slot that opens into the channel;

wherein the track has a cover flange disposed opposite to the load flange;

wherein the track has a mount wall;

wherein the mount wall connects the load flange to the cover flange;

wherein the track has a lateral guide flange;

wherein the lateral guide flange extends opposite to the mount wall;

wherein the lateral guide flange has a flange edge;

wherein the lateral guide flange has a base connected to the cover flange;

wherein the load flange and the lateral guide flange define the slot that opens into the channel;

wherein the bracket has a mount flange;

wherein the bracket has a connector flange that connects the mount flange to the support flange;

wherein the bracket has a brace flange;

wherein the brace flange faces the mount wall when the bracket is mounted in the track;

wherein the bracket has an insertion flange;

wherein the insertion flange has a contact ridge; and wherein the insertion flange extends towards the base of the track when the bracket is mounted to the track.

10. The system of claim 9, wherein the bracket has a stopper extending from at least one side of the bracket.

11. The system of claim 9, further comprising a folding tray table secured to the bracket.

12. The system of claim 11, wherein the folding tray table includes a tray pivotally coupled to a back plate.

13. The system of claim 12, wherein the folding tray table has a cutting board configured to slide out from at least one side of the tray.

14. The system of claim 12, wherein the back plate has a magnet to couple the back plate to a vehicle panel.

15. The system of claim 14, wherein the magnet is covered in a coating to inhibit scuffing.

16. The system of claim 9, further comprising a hook coupled to the bracket.

17. The system of claim 9, further comprising a television mount coupled to the bracket.

18. The system of claim 9, wherein the bracket has a stopper extending from at least one side of the bracket.

19. The system of claim 9, further comprising:

a vehicle including a sliding door mechanism; and wherein the sliding door mechanism includes the track.

20. The system of claim 19, wherein the track is a middle track.

* * * * *